US012670563B2

(12) United States Patent
Spielman et al.

(10) Patent No.: US 12,670,563 B2
(45) Date of Patent: Jun. 30, 2026

(54) IMAGE RECOVERY APPARATUS AND REMOVING ABERRATIONS IN AN ACQUIRED IMAGE FROM IMPERFECT IMAGING OPTICS

(71) Applicant: Government of the United States of America, as represented by the Secretary of Commerce, Gaithersburg, MD (US)

(72) Inventors: Ian Bairstow Spielman, North Potomac, MD (US); Emine Altuntas, Germantown, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 497 days.

(21) Appl. No.: 18/141,528

(22) Filed: May 1, 2023

(65) Prior Publication Data

US 2023/0351559 A1    Nov. 2, 2023

Related U.S. Application Data

(60) Provisional application No. 63/336,315, filed on Apr. 29, 2022.

(51) Int. Cl.
*G06T 5/80*        (2024.01)
*G02B 21/36*       (2006.01)
(Continued)

(52) U.S. Cl.
CPC .................. *G06T 5/80* (2024.01); *G06T 5/50* (2013.01); *G06T 7/0012* (2013.01)

(58) Field of Classification Search
CPC ........... G06T 5/80; G06T 5/50; G06T 7/0012; G06T 5/70; G06T 2207/10056; G02B 27/58; G02B 21/365
(Continued)

(56) References Cited

U.S. PATENT DOCUMENTS

2003/0210344 A1*  11/2003  Bloom ................... H04N 25/63
                                                      348/E5.081
2004/0066910 A1*   4/2004  De Villiers .......... G06T 11/005
                                                          378/7
(Continued)

OTHER PUBLICATIONS

G. Desiderá et al. Application of iterative blind deconvolution to the reconstruction of LBT LINC-NIRVANA images, Feb. 11, 2006, Università di Genova (Year: 2006).*
(Continued)

*Primary Examiner* — Chineyere Wills-Burns
*Assistant Examiner* — Lucius Cameron Gree Allen
(74) *Attorney, Agent, or Firm* — Office of Chief Counsel for National Institute of Standards and Technology

(57)        ABSTRACT

A process for removing aberrations in an acquired image from imperfect imaging optics includes: acquiring an acquired image of an object with an imperfect imaging system that includes an imperfect imaging optic, the acquired image including a plurality of pixels; producing a prior that includes an expectation of data for the object; determining a pixel-by-pixel uncertainty of the acquired image; determining a total transfer function of the acquired image from the prior and the acquired image; and determining a data vector from the total transfer function and the acquired image to remove aberrations from the acquired image.

23 Claims, 16 Drawing Sheets

200

(51) Int. Cl.

| | | |
|---|---|---|
| *G02B 27/58* | (2006.01) | |
| *G06T 5/50* | (2006.01) | |
| *G06T 5/70* | (2024.01) | |
| *G06T 7/00* | (2017.01) | |

(58) Field of Classification Search
USPC ......................................................... 382/128
See application file for complete search history.

(56) References Cited

U.S. PATENT DOCUMENTS

| | | | | |
|---|---|---|---|---|
| 2006/0139494 | A1* | 6/2006 | Zhou ...................... | H04N 5/144 |
| | | | | 348/E5.065 |
| 2007/0002158 | A1* | 1/2007 | Robinson ........... | G02B 27/0075 |
| | | | | 348/E5.025 |
| 2008/0262806 | A1* | 10/2008 | Vau ...................... | G05B 13/042 |
| | | | | 703/2 |
| 2009/0263002 | A1* | 10/2009 | Cremer ................... | G06T 5/20 |
| | | | | 382/133 |
| 2010/0299113 | A1* | 11/2010 | Robinson ................ | G06F 30/20 |
| | | | | 703/2 |
| 2011/0096207 | A1* | 4/2011 | Izumi .................... | G03B 19/12 |
| | | | | 348/241 |
| 2013/0105689 | A1* | 5/2013 | Bischoff ................ | H01J 37/22 |
| | | | | 250/307 |
| 2013/0343669 | A1* | 12/2013 | Fattal ................... | G06T 5/20 |
| | | | | 382/255 |
| 2015/0181131 | A1* | 6/2015 | Kerwien ................ | H04N 5/262 |
| | | | | 348/239 |
| 2015/0317771 | A1* | 11/2015 | Kato ....................... | G06T 5/10 |
| | | | | 378/62 |
| 2020/0265555 | A1* | 8/2020 | Elgendy ................... | G06T 3/18 |
| 2022/0261966 | A1* | 8/2022 | Liu ........................ | H04N 9/646 |
| 2022/0277427 | A1* | 9/2022 | Bromberg ................ | G06T 5/80 |

OTHER PUBLICATIONS

Moulakaki AI, Del Águila-Carrasco AJ, Esteve-Taboada JJ, Montés-Micó R. Effect of even and odd-order aberrations on the accommodation response. Int J Ophthalmol. Jun. 18, 2017; 10(6):955-960. (Year: 2017).*

Minglu Sun, Xiong Chen, Youqiang Zhu, Dayu Li, Quanquan Mu, and Li Xuan, "Neural network model combined with pupil recovery for Fourier ptychographic microscopy," Opt. Express 27, 24161-24174 (Year: 2019).*

Turner, L.D., et al., "Diffraction-contrast imaging of cold atoms", Physical Review A, 2005, p. 031403, vol. 72.

Perry, A.R., et al., "Multiple-camera defocus imaging of ultracold atomic gases", Optics Express, 2021, p. 17029, vol. 29 No.11

Penczek, P.A., et al., "Three Dimensional Reconstruction With Contrast Transfer Compensation From Defocus Series", Scanning Microscopy, 1997, p. 147-154, vol. 11.

Fienup, J.R., et al., "Hubble Space Telescope Characterized by Using Phase-Retrieval Algorithms", Applied Optics, 993, p. 1747-1767, vol. 32 No. 10.

Altuntas, E., et al., "Self-Bayesian aberration removal via constraints for ultracold atom microscopy", Physical Review Research, 2021, p. 043087, vol. 3.

* cited by examiner

200

200

200

212

Object          Lens          Phase dot          Lens          CCD

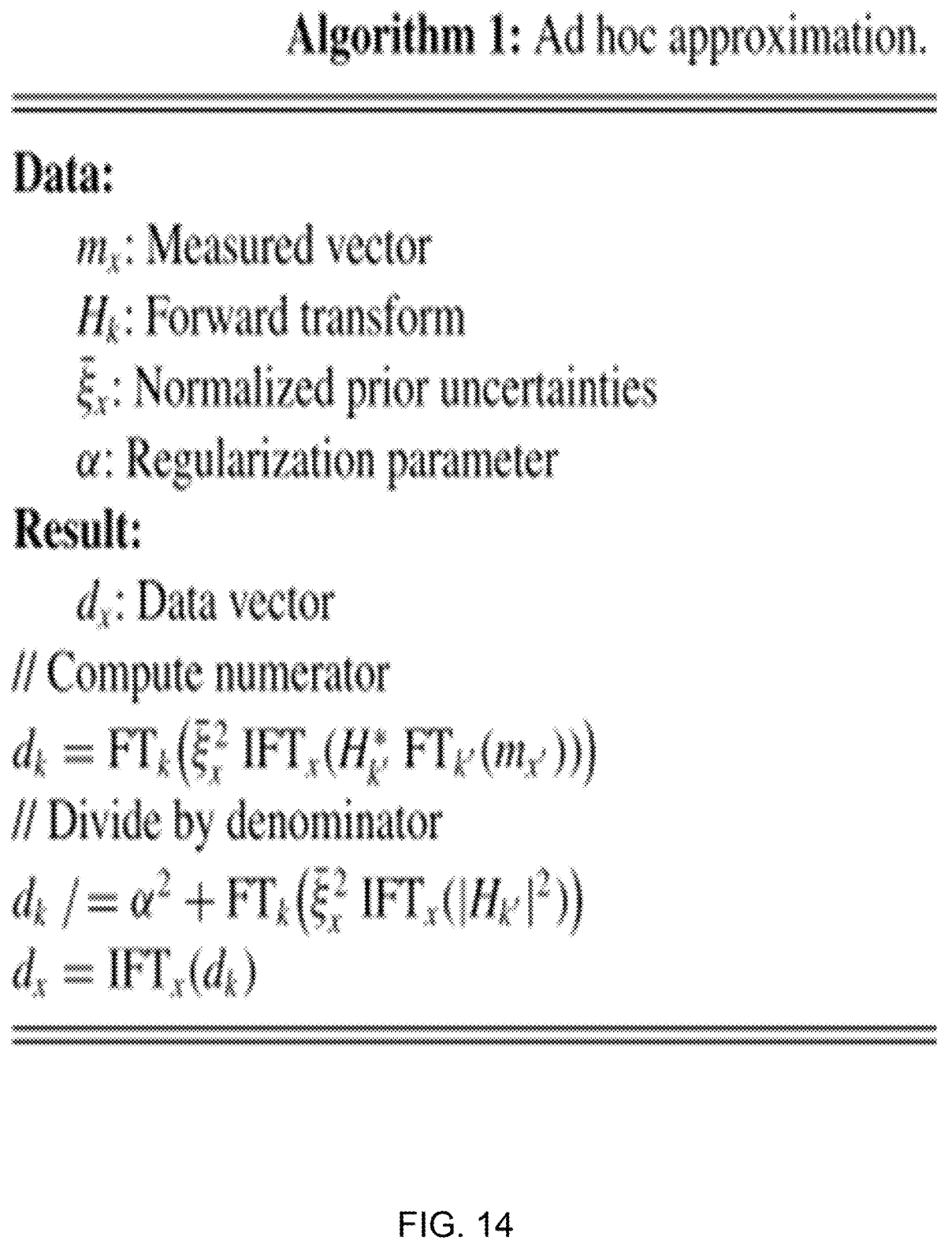

Algorithm 1: Ad hoc approximation.

Data:

$m_x$: Measured vector $H_k$: Forward transform $\tilde{\xi}_x$: Normalized prior uncertainties $\alpha$: Regularization parameter

Result:

$d_x$: Data vector

// Compute numerator $d_k = \mathrm{FT}_k\left(\tilde{\xi}_x^2\ \mathrm{IFT}_x\left(H_{k'}^*\ \mathrm{FT}_{k'}(m_{x'})\right)\right)$ // Divide by denominator $d_k\ / = \alpha^2 + \mathrm{FT}_k\left(\tilde{\xi}_x^2\ \mathrm{IFT}_x(|H_{k'}|^2)\right)$ $d_x = \mathrm{IFT}_x(d_k)$

FIG. 14

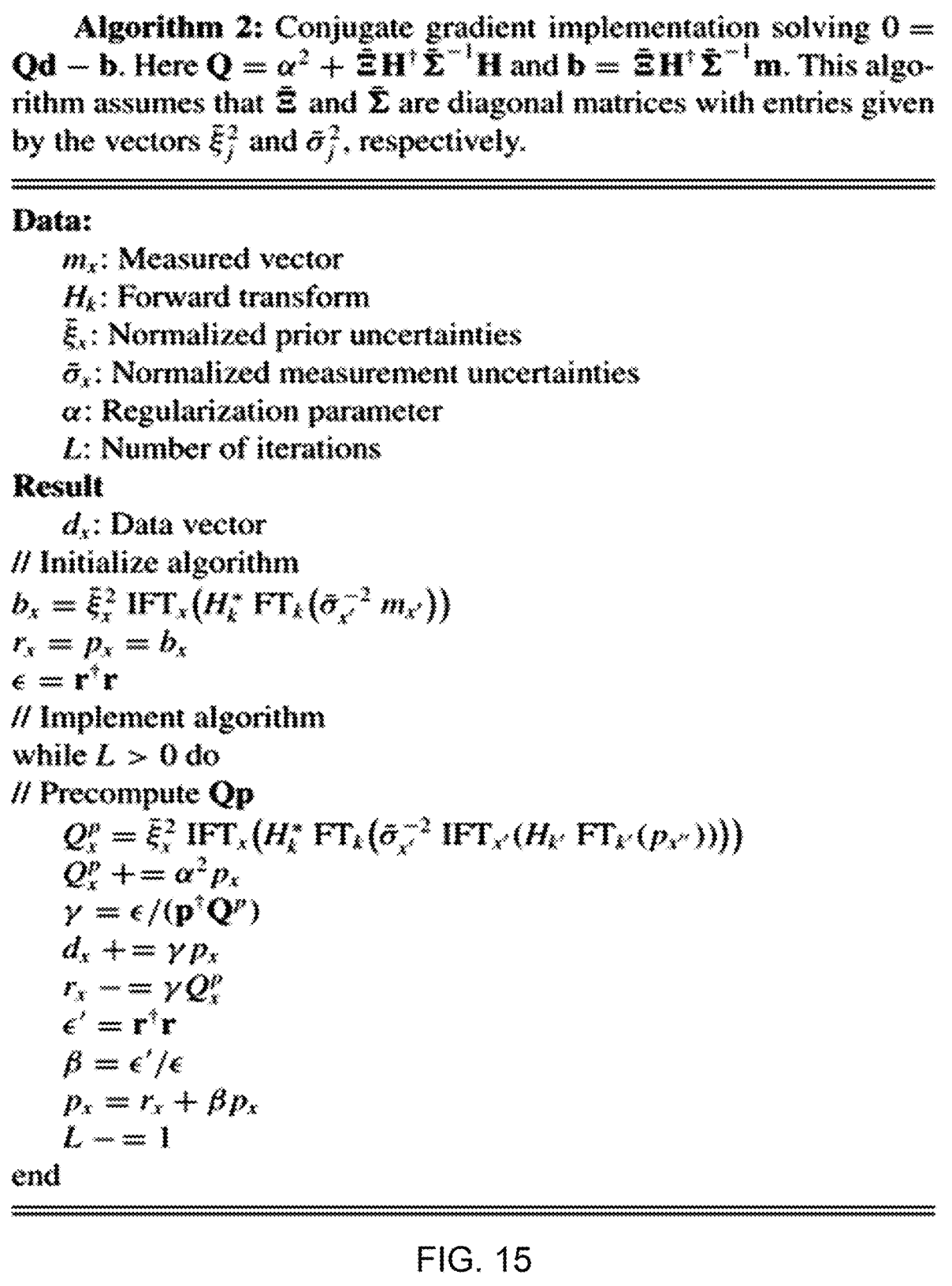

Algorithm 2: Conjugate gradient implementation solving $0 = \mathbf{Qd} - \mathbf{b}$. Here $\mathbf{Q} = \alpha^2 + \bar{\bar{\Xi}} \mathbf{H}^\dagger \bar{\Sigma}^{-1} \mathbf{H}$ and $\mathbf{b} = \bar{\bar{\Xi}} \mathbf{H}^\dagger \bar{\Sigma}^{-1} \mathbf{m}$. This algorithm assumes that $\bar{\bar{\Xi}}$ and $\bar{\Sigma}$ are diagonal matrices with entries given by the vectors $\bar{\xi}_j^2$ and $\bar{\sigma}_j^2$, respectively.

Data:

$m_x$: Measured vector $H_k$: Forward transform $\bar{\xi}_x$: Normalized prior uncertainties $\bar{\sigma}_x$: Normalized measurement uncertainties $\alpha$: Regularization parameter $L$: Number of iterations

Result

$d_x$: Data vector

// Initialize algorithm $b_x = \bar{\xi}_x^2 \, \mathrm{IFT}_x\left(H_k^* \, \mathrm{FT}_k\left(\bar{\sigma}_{x'}^{-2} \, m_{x'}\right)\right)$ $r_x = p_x = b_x$ $\epsilon = \mathbf{r}^\dagger \mathbf{r}$ // Implement algorithm while $L > 0$ do // Precompute $\mathbf{Qp}$ $Q_x^p = \bar{\xi}_x^2 \, \mathrm{IFT}_x\left(H_k^* \, \mathrm{FT}_k\left(\bar{\sigma}_{x'}^{-2} \, \mathrm{IFT}_{x'}\left(H_{k'} \, \mathrm{FT}_{k'}\left(p_{x''}\right)\right)\right)\right)$ $Q_x^p \mathrel{+}= \alpha^2 p_x$ $\gamma = \epsilon / (\mathbf{p}^\dagger \mathbf{Q}^p)$ $d_x \mathrel{+}= \gamma p_x$ $r_x \mathrel{-}= \gamma Q_x^p$ $\epsilon' = \mathbf{r}^\dagger \mathbf{r}$ $\beta = \epsilon' / \epsilon$ $p_x = r_x + \beta p_x$ $L \mathrel{-}= 1$ end

FIG. 15

| Parameter | $c_{00}$ | $c_{11}$ | $c_{03}$ | $c_{31}$ |
|---|---|---|---|---|
| Value | 1.590(4) | −43.3(4) | $-0.52(2) \times 10^3$ | $1.82(2) \times 10^3$ |

| Parameter | $c_{13}$ | $c_{22}$ | $c_{40}$ | $c_{04}$ |
|---|---|---|---|---|
| Value | $2.71(3) \times 10^3$ | $-0.26(4) \times 10^3$ | $-1.85(2) \times 10^3$ | $-3.35(2) \times 10^3$ |

| Parameter | $c_{dof}$ | $g_S$ |
|---|---|---|
| Value | 35.9(1) | 3.033(2) |

FIG. 16

IMAGE RECOVERY APPARATUS AND REMOVING ABERRATIONS IN AN ACQUIRED IMAGE FROM IMPERFECT IMAGING OPTICS

CROSS REFERENCE TO RELATED APPLICATIONS

This application claims the benefit of U.S. Provisional Patent Application Ser. No. 63/336,315 (filed Apr. 29, 2022), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a computer implemented process for removing aberrations in an acquired image from imperfect imaging optics, the process comprising: acquiring an acquired image of an object with an imperfect imaging system that comprises an imperfect imaging optic, the acquired image comprising a plurality of pixels; producing a prior that comprises an expectation of data for the object; determining a pixel-by-pixel uncertainty of the acquired image; determining a total transfer function hk of the acquired image from the prior and the acquired image; and determining a data vector d from the total transfer function $h_k$ and the acquired image to remove aberrations from the acquired image.

Disclosed is an image recovery apparatus for removing aberrations in an acquired image from imperfect imaging optics, the image recovery apparatus comprising: a processor configured to execute a process for removing aberrations in an acquired image from imperfect imaging optics, the process comprising the steps of: acquiring an acquired image of an object with an imperfect imaging system that comprises an imperfect imaging optic, the acquired image comprising a plurality of pixels; producing a prior that comprises an expectation of data for the object; determining a pixel-by-pixel uncertainty of the acquired image; determining a total transfer function $h_k$ of the acquired image from the prior and the acquired image; and determining a data vector d from the total transfer function $h_k$ and the acquired image to remove aberrations from the acquired image; and a display configured to display a reconstructed image of the object, the reconstructed image being based on the data vector d.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

FIG. 14 shows, according to some embodiments, Algorithm 1 for computational steps to implement the ad hoc convolution approximation.

FIG. 15 shows, according to some embodiments, Algorithm 2 for conjugate gradient implementation.

FIG. 16 shows, according to some embodiments, best-fit parameter values, wherein shared global parameters $g_S$, $c_{DOF}$, and $c_{mn}$ (for n,m≥0 and even n+m) result from PSD fits and $c_{03}$ derived from coordinate space TF fits, and coefficients are dimensionless.

DETAILED DESCRIPTION

Figure 1:
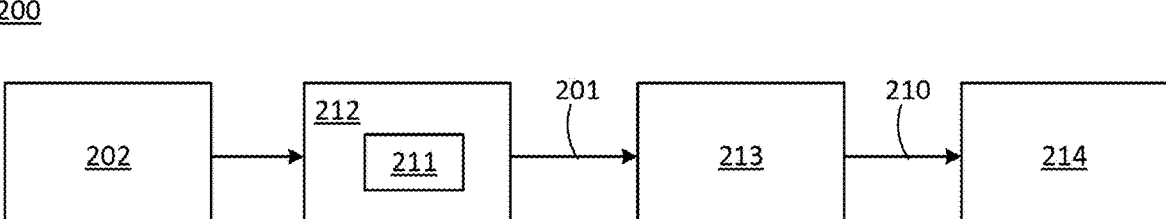
FIG. 1 shows, according to some embodiments, an image recovery apparatus.
Figure 2:
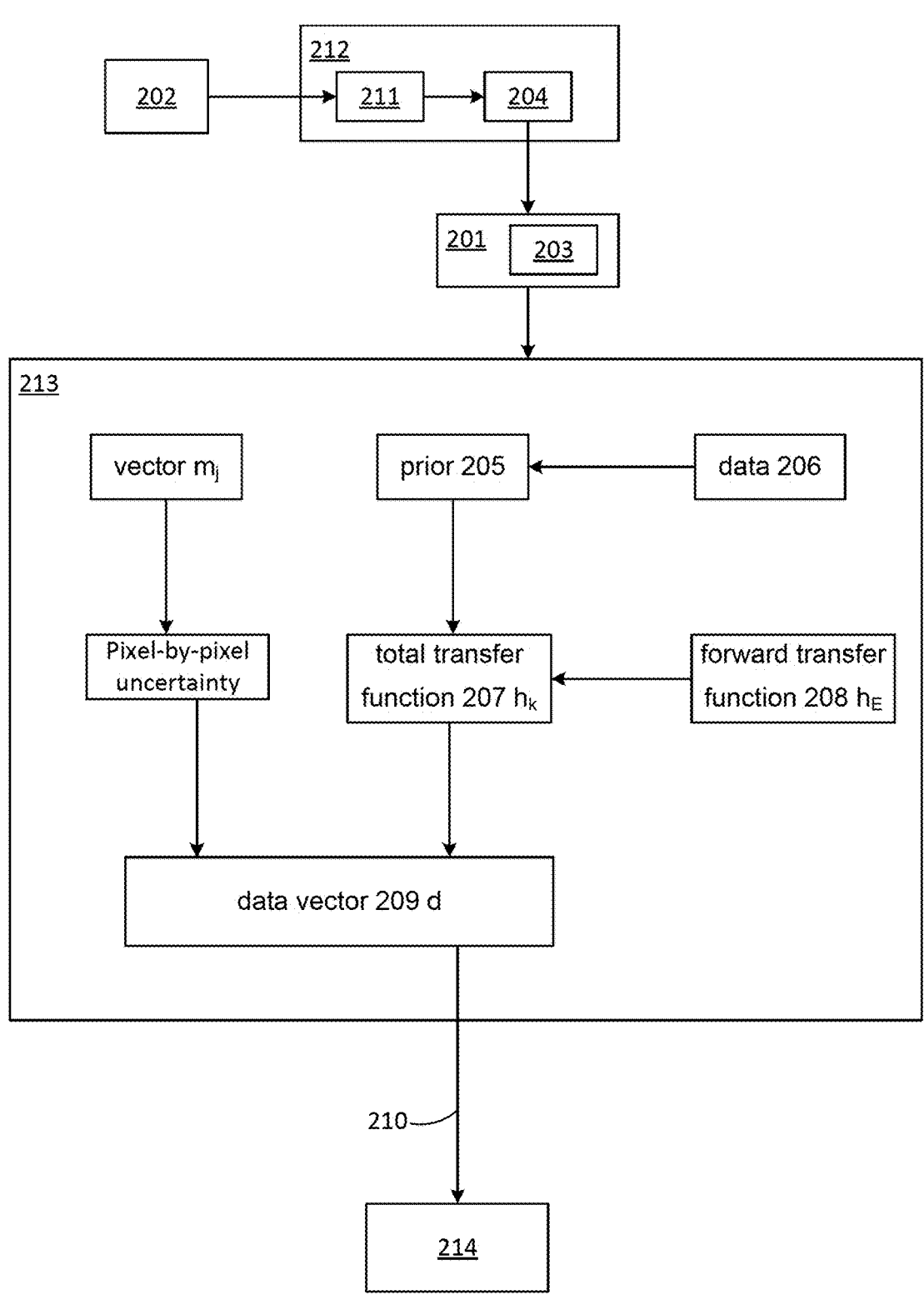
FIG. 2 shows, according to some embodiments, an image recovery apparatus and removing aberrations in an acquired image from imperfect imaging optics.

A detailed description of one or more embodiments is presented herein by way of exemplification and not limitation.

Image degradation is a common problem in many applications, such as photography, videography, spectroscopic imaging, and medical imaging. There are many factors that can cause image degradation, including noise, blur, imperfect optics, and occlusion. Noise is random variation in the pixel values of an image. Blur is caused by the spread of light over time or space. Imperfect optics fail to produce a faithful image of the object. Occlusion is caused by objects blocking the view of other objects in an image.

Image recovery is the process of restoring an image of an object that has been degraded. There are many different methods for image recovery, each with its own advantages and disadvantages. Some common methods include denoising, deblurring, and inpainting. Denoising is the process of removing noise from an image. Denoising methods can be based on statistical models, such as the Gaussian model, or on prior knowledge of the image, such as the smoothness prior. Deblurring is the process of removing blur from an image. Deblurring methods can be based on the Wiener filter, the Lucy-Richardson algorithm, or the nonlocal means algorithm. Inpainting is the process of filling in missing data in an image. Inpainting methods can be based on the patch match algorithm, the sparse coding algorithm, or the exemplar-based inpainting algorithm.

Conventional technology for image recovery has several limitations. For example, the Gaussian model is not always a good fit for real-world images. The Wiener filter is not always effective at removing noise from images with high levels of noise. The Lucy-Richardson algorithm is not always effective at removing blur from images with high levels of blur. The nonlocal means algorithm is not always effective at removing noise from images with high levels of noise or blur. The patch match algorithm is not always effective at inpainting images with large amounts of missing data. The sparse coding algorithm is not always effective at inpainting images with large amounts of missing data. The exemplar-based inpainting algorithm is not always effective at inpainting images with large amounts of missing data.

Sophisticated multi-element lens systems are able to image objects with resolutions approaching fundamental limits and are typically expensive. In many cases, because of technical incompatibilities, conflicting requirements, or expense, these multi-element lens systems are not employed. As described herein, image recovery apparatus 200 and process for removing aberrations in an acquired image from imperfect imaging optics overcomes these limitations and is adaptable, simple, effective, and can be integrated to conventional hardware. It is contemplated that image recovery apparatus 200 and process for removing aberrations in an acquired image from imperfect imaging optics can include an imperfect imaging system and an image reconstructor that uses prior information to obtain and apply a Bayesian inverse to acquired images.

Beneficially, removing aberrations in an acquired image from imperfect imaging optics provides construction of novel microscope systems that yields high-fidelity and near-diffraction limited final output images. Additionally, disclosed is a build and calibration of a microscope system that includes low-cost off-the-shelf optical elements with significant aberrations that is subjected to the Bayesian inverse using a conjugate gradient method, producing images with aberrations eliminated. Advantageously, removing aberrations in an acquired image from imperfect imaging optics is compatible with a wide range of imaging strategies and implementations. Removing aberrations in an acquired image from imperfect imaging optics leverages prior information both about the object under study (such as its approximate size, shape and location) as well as the imperfect imaging system (such as its aberrations and apertures).

In an embodiment, with reference to FIG. 1, FIG. 2, FIG. 3, and FIG. 4, a computer implemented process for removing aberrations in an acquired image from imperfect imaging optics includes acquiring an acquired image 201 of object 202 with imperfect imaging system 212 that includes imperfect imaging optic 211, acquired image 201 including a plurality of pixels 203; producing prior 205 that includes an expectation of data 206 for object 202; determining a pixel-by-pixel uncertainty of acquired image 201; determining total transfer function 207 $h_k$ of acquired image 201 from prior 205 and acquired image 201; and determining data vector 209 $d$ from total transfer function 207 $h_k$ and acquired image 201 to remove aberrations from acquired image 201. In an embodiment, removing aberrations in an acquired image from imperfect imaging optics includes converting acquired image 201 to vector $m_j$.

In an embodiment, prior 205 is set to zero if there is no expectation of data 206. In an embodiment, prior 205 is provided by a Gaussian distribution function. In an embodiment, the expectation includes information about object 202 (e.g., its size, shape, or location) or information about imperfect imaging system 212 (e.g., its aberrations or apertures).

In an embodiment, determining the pixel-by-pixel uncertainty of acquired image 201 includes accounting for photon shot noise of digital imaging device 204 of imperfect imaging system 212 that acquired the acquired image 201. In an embodiment, accounting for the photon shot noise includes obtaining the square root of the pixel values of acquired image 201. In an embodiment, removing aberrations in an acquired image from imperfect imaging optics includes performing background subtraction on acquired image 201 prior to determining the pixel-by-pixel uncertainty of acquired image 201. In an embodiment, removing aberrations in an acquired image from imperfect imaging optics includes, after performing background subtraction, replacing any negative values of the pixel values with a positive value. In an embodiment, the positive value is the smallest positive number of all of the pixels. In an embodiment, the positive value is obtained by averaging pixel values of neighboring pixels.

In an embodiment, determining the pixel-by-pixel uncertainty of the acquired image 201 includes accounting for readout noise of imperfect imaging system 212 that acquired the acquired image 201.

In an embodiment, total transfer function 207 $h_k$ is provided by $$ h_{tot}(k_\perp) = \sqrt{\frac{1}{4} + \bar{\delta}^2}\, h_{DOF}(k_\perp) \frac{h_E(k_\perp)}{h_E(0)} e^{i(\varphi - \theta)}. $$

In an embodiment, determining total transfer function 207 $h_k$ includes determining aberrations in acquired image 201, wherein the aberrations include attenuation $\gamma$ and phase shift $\beta$. In an embodiment, in determining total transfer function 207 $h_k$, attenuation $\gamma$ and phase shift $\beta$ are accounted for by the following forward transfer function 208 $h_E$ $$ h_E(k_\perp) = e^{-\gamma(k_\perp) + i\beta(k_\perp)}. $$

In an embodiment, data vector 209 $d$ is an optimal reconstructed image 210. In an embodiment, determining data vector 209 $d$ includes numerically solving linear equations with a conjugate gradient method.

In an embodiment, removing aberrations in an acquired image from imperfect imaging optics includes verifying a statistical likelihood of data vector 209 $d$ based on acquired image 201 and the pixel-by-pixel uncertainty of acquired image 201. In an embodiment, verifying the statistical likelihood of data vector 209 $d$ includes evaluating $$ (Hd - m)^\dagger \sum{}^{-1} (Hd - m). $$

In an embodiment, removing aberrations in an acquired image from imperfect imaging optics includes estimating a Fourier pupil function of imperfect imaging system 212. In an embodiment, estimating the Fourier pupil function includes determining a density correlation. In an embodiment, estimating the Fourier pupil function includes determining aberrations in acquired image 201 from a diffraction pattern in acquired image 201. In an embodiment, estimating the Fourier pupil function includes determining a point spread function and obtaining even order aberrations from the point spread function. In an embodiment, removing aberrations in an acquired image from imperfect imaging optics includes producing a polynomial a plurality of loss coefficients as a result of estimating the Fourier pupil function of imperfect imaging system 212.

In an embodiment, removing aberrations in an acquired image from imperfect imaging optics includes quantifying the spatial structure of object 202 as the pixel-by-pixel uncertainty of acquired image 201.

In an embodiment, with reference to FIG. 1, FIG. 2, FIG. 3, and FIG. 4, image recovery apparatus 200 for removing aberrations in an acquired image from imperfect imaging optics includes: processor 213 configured to execute a process for removing aberrations in an acquired image from imperfect imaging optics, the process comprising the steps of: acquiring an acquired image 201 of object 202 with imperfect imaging system 212 that includes imperfect imaging optic 211, acquired image 201 including a plurality of pixels 203; producing prior 205 that includes an expectation of data 206 for object 202; determining a pixel-by-pixel uncertainty of acquired image 201; determining total transfer function 207 $h_k$ of acquired image 201 from prior 205 and acquired image 201; and determining data vector 209 $d$ from total transfer function 207 $h_k$ and acquired image 201 to remove aberrations from acquired image 201; and display 214 configured to display reconstructed image 210 of object 202, reconstructed image 210 being based on data vector 209 $d$.

In an embodiment, processor 213 is configured to execute a process for estimating a Fourier pupil function of imperfect imaging system 212, and the process comprising the steps of: determining a density correlation; determining aberrations in acquired image 201 from a diffraction pattern in acquired image 201; determining a point spread function and obtaining even order aberrations from the point spread function; or producing a polynomial a plurality of loss coefficients as a result of estimating the Fourier pupil function of imperfect imaging system 212. In an embodiment, processor 213 is configured to execute a process for quantifying the spatial structure of object 202 as the pixel-by-pixel uncertainty of acquired image 201.

In an embodiment, display 214 is configured to display a plurality of reconstructed images 210 of object 202, each reconstructed image 210 being based on a different data vector 209 $d$.

In an embodiment, image recovery apparatus 200 is configured to be used with a plurality of different imaging systems.

Figure 3:
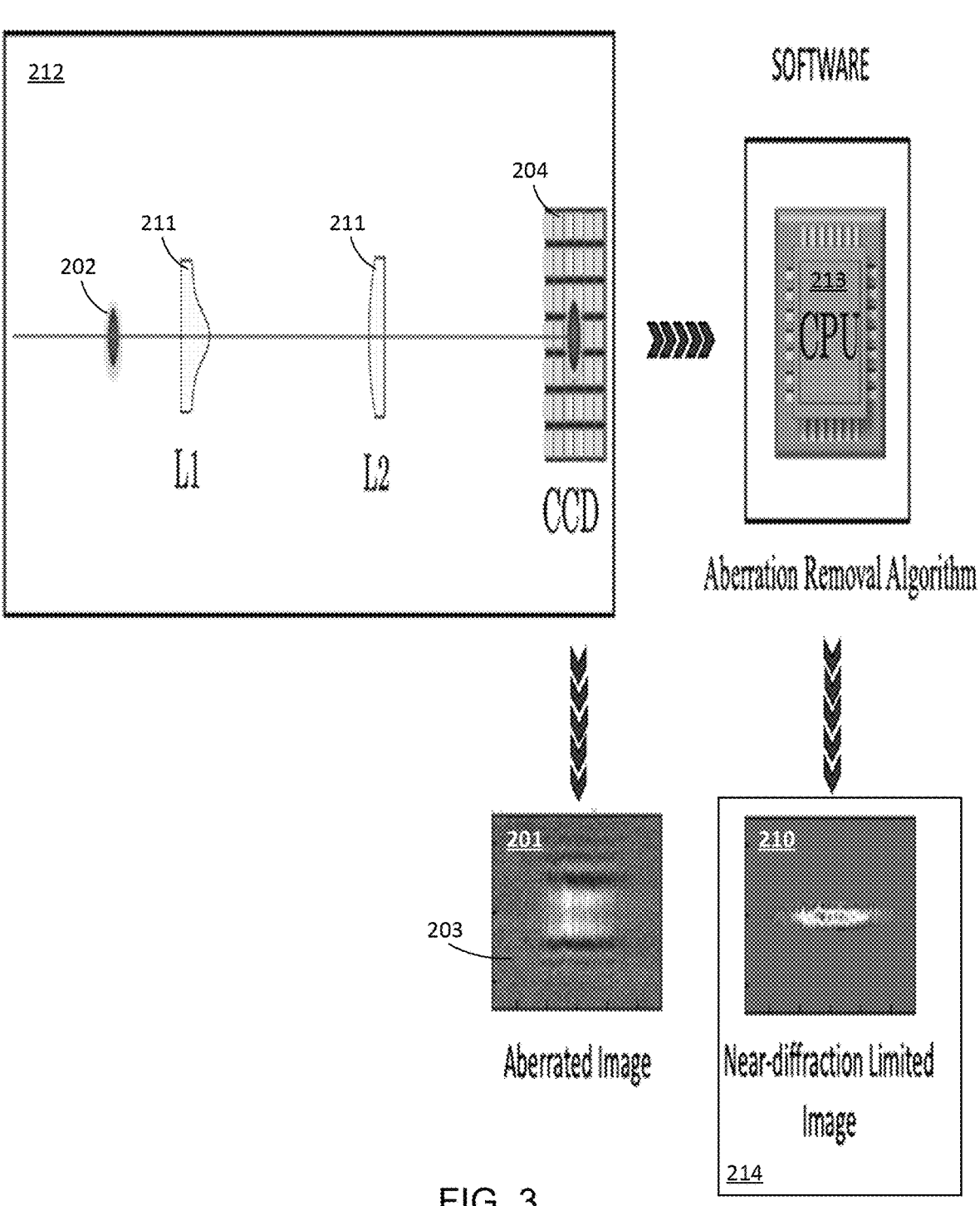
FIG. 3 shows, according to some embodiments, an image recovery apparatus and removing aberrations in an acquired image from imperfect imaging optics.

In an embodiment, with reference to FIG. 3, image recovery apparatus 200 and removing aberrations in an acquired image from imperfect imaging optics include imperfect imaging system 212 that includes imperfect imaging optic 211, e.g., aspheric lens L1 to provide a high numerical aperture (NA) and achromatic lens L2. Imperfect imaging system 212 produces acquired image 201 having aberrated data. Additionally, processor 213 receives acquired image 201 and subject acquired image 201 to Bayesian inversion to produce near-diffraction limited reconstructed image 210 from removal of aberrations from acquired image 201.

Imperfect imaging system 212 produces acquired image 201 that is converted vector m. Image m includes aberrations resulting from imperfections of imperfect imaging optic 211 in imperfect imaging system 212. Bayesian inference includes maximizing:

$$E = \alpha^2 (d-p)^\dagger \bar{\Xi}^{-1}(d-p) + (Hd-m)^\dagger \bar{\sum}^{-1}(Hd-m).$$

to obtain data vector 209 $d$ that is the optimal reconstructed image 210 for acquired image 201. In this expression, p is a Bayesian prior 205 for reconstructed image 210. It should be appreciated that reconstructed image 210 is the image that is expected in absence of any additional information, which is set to zero in most cases. Here, $\Xi$ is a matrix (with maximum eigenvalue $\xi_{max}$) and includes an expectation of data 206 (i.e., pre-existing information) about the structure of data 206 (such as the location on acquired image 201 of a feature or an impact of apertures included in imperfect imaging system 212. Also, $\Sigma$ is a covariance matrix with minimum eigenvalue $\sigma_{min}$ and includes known measurement uncertainties (e.g., photon shot noise, camera readout noise, amplification noise, and the like) and their correlations. Here, $\alpha=|\sigma_{min}/\xi_{max}|$ is a regularization parameter. The expression for E can be simplified with the expression $\bar{\Xi}=\Xi/\xi_{max}$ or $\bar{\Sigma}=\Sigma/\sigma_{min}$. H is a contrast transfer function (CTF) for how a perfect image is altered by imperfect imaging system 212.

Dissimilar from conventional imaging reconstruction technology, removing aberrations in an acquired image from imperfect imaging optics includes prior information, parametrized by $\Xi$, Bayesian prior p, and covariance matrix $\Sigma$. Exemplary conventional technology includes image corrections for optical microscopy and for electron microscopy. Such conventional technology produce reconstructions with significant artifacts and do not obtain diffraction-limited performance. Some conventional technology required acquisition of multiple images of the same object or include multiple optics to achieve this end, resulting in complexity, optical losses, and cost. It should be appreciated that image recovery apparatus 200 and removing aberrations in an acquired image from imperfect imaging optics provide, e.g., a high-fidelity imaging system without involving multiple images or additional optics beyond those in conventional high-resolution imaging systems. With reference to FIG. 15, the process for removing aberrations in an acquired image from imperfect imaging optics can involve, e.g., a conjugate gradient algorithm to obtain the final high-resolution image as data vector 209 $d$. Here, this method of solution L is the number of times the method is iterated. The number of iterations L can be selected to provide suitable convergence in the conjugate gradient method, e.g., L=50.

According to an embodiment, a process for removing aberrations in an acquired image from imperfect imaging optics includes estimating the Fourier pupil function of the imaging system. If the imaging system includes calibrated elements (e.g., lenses, mirrors, and the like) with placement of these elements measured accurately, then a comprehensive optical design and analysis software package can compute the pupil function. If a spatially random phase or amplitude object is available with structure on a scale below the resolution of the imaging system, then the method described in the example for Fourier pupil function measurements provides even order aberrations. If an absorbing object smaller than the resolution of the imaging system is available, then the measured diffraction pattern provides the aberrations. If a pinhole smaller than the resolution of the imaging system is available, the measured point spread function provides even order aberrations. The result of estimating the Fourier pupil function of the imaging system can be a list of polynomial and loss coefficients, e.g., as shown in FIG. 16. The nominal spatial structure of the object quantified as an uncertainty is $\xi_j$ in the Example. If the object has compact support, its region of support is recorded. After estimating the Fourier pupil function of the imaging system, process for removing aberrations in an acquired image from imperfect imaging optics includes acquiring an image on a digital image device, wherein the image is indicated as $m_j$ in the Example; encoding pre-existing expectations of the data in terms of a prior $p_j$ wherein $p_j$ can be set to zero if there is no prior; estimating the pixel-by-pixel uncertainty of this image, e.g., as $\sigma_j$ in the Example, wherein when estimating the noise: an estimate proportional to the photon shot noise contribution can be estimated by taking the square root of the pixel values, or readout noise can be provided by the camera manufacturer; computing matrix $h_k$ using Eq. (34) of the Example with aberrations from Eq. (31); solving Eq. 47 or Eq. (48) of the Example; using the conjugate gradient method to obtain data vector $d_x$ of Eq. (47); and optionally evaluating $(Hd-m)+\Xi^*(Hd-m)$ of Eq. (44) in the Example to verify the statistical likelihood of the reconstruction based on the given data and uncertainty estimate, which taken across a large data set should about equal to the number of pixels in the image. In solving Eq. (47) or Eq. (48) the size of the matrix can be accounted for. For small (up to about 100×100 pixels, corresponding to 10,000×10,000 matrix, the matrix can be exactly inverted by computing the matrix inverse with using packages such as BLAS or LAPACK. For large matrices, the conjugate gradient algorithm shown in FIG. 15 solves this problem, wherein typically, e.g., 50 iterations can provide acceptable convergence. The implementation can be performed on a CPU-based system, and considerable speedup can occur for a GPU-based deployment.

It is contemplated that image recovery apparatus 200 and removing aberrations in an acquired image from imperfect imaging optics can include the properties, functionality, hardware, and process steps described herein and embodied in any of the following non-exhaustive list:

a process (e.g., a computer-implemented method including various steps; or a method carried out by a computer including various steps);

an apparatus, device, or system (e.g., a data processing apparatus, device, or system including means for carrying out such various steps of the process; a data processing apparatus, device, or system including means for carrying out various steps; a data processing apparatus, device, or system including a processor adapted to or configured to perform such various steps of the process);

a computer program product (e.g., a computer program product including instructions which, when the program is executed by a computer, cause the computer to carry out such various steps of the process; a computer program product including instructions which, when the program is executed by a computer, cause the computer to carry out various steps);

computer-readable storage medium or data carrier (e.g., a computer-readable storage medium including instructions which, when executed by a computer, cause the computer to carry out such various steps of the process; a computer-readable storage medium including instructions which, when executed by a computer, cause the computer to carry out various steps; a computer-readable data carrier having stored thereon the computer program product; a data carrier signal carrying the computer program product);

a computer program product including comprising instructions which, when the program is executed by a first computer, cause the first computer to encode data by performing certain steps and to transmit the encoded data to a second computer; or a computer program product including instructions which, when the program is executed by a second computer, cause the second computer to receive encoded data from a first computer and decode the received data by performing certain steps.

Image recovery apparatus 200 can be made of various elements and components that are fabricated or assembled from off the shelf components. Elements of image recovery apparatus 200 can be various sizes and can be made of a material that is physically or chemically resilient in an environment in which image recovery apparatus 200 is disposed. Exemplary materials include a metal, ceramic, thermoplastic, glass, semiconductor, and the like. The elements of image recovery apparatus 200 can be made of the same or different material and can be monolithic in a single physical body or can be separate members that are physically joined. For example, transmission of visible light by imperfect imaging optic 211 of imperfect imaging system 212 can be provided by fused silica.

Image recovery apparatus 200 can be made in various ways. It should be appreciated that image recovery apparatus 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, image recovery apparatus 200 can be disposed in a terrestrial environment or space environment. Elements of image recovery apparatus 200 can be formed from silicon, silicon nitride, and the like although other suitable materials, such ceramic, glass, or metal can be used. According to an embodiment, the elements of image recovery apparatus 200 are formed using 3D printing although the elements of image recovery apparatus 200 can be formed using other methods, such as injection molding or machining a stock material such as block of material that is subjected to removal of material such as by cutting, laser oblation, and the like. Accordingly, image recovery apparatus 200 can be made by additive or subtractive manufacturing. In an embodiment, elements of image recovery apparatus 200 are selectively etched to remove various different materials using different etchants and photolithographic masks and procedures. The various layers thus formed can be subjected to joining by bonding to form image recovery apparatus 200.

An imperfect imaging system does not perfectly reproduce the image of an object. This can be due to a variety of factors, such as aberrations in the optical system, noise in the detector, or distortions in the display. The imperfect imaging system can include various components such as an object, optical system, detector, display, and the like. The object is the thing that is being imaged. It can be a physical object, such as a person or a scene, or quantum object such as a collection of cold atoms. The optical system is the part of the imaging system that collects light from the object and focuses it onto the detector. It can be a simple lens, a complex mirror system, or a combination of lenses and mirrors. The detector is the part of the imaging system that converts light into an electrical signal. It can be a film, a charge-coupled device (CCD), a complementary metal-oxide-semiconductor (CMOS) sensor, and the like. The display is the part of the imaging system that converts the electrical signal from the detector into a visible image. It can be a computer monitor, television, projector, and the like.

Operating an imperfect imaging system can include: collecting light from the object by the optical system; focusing the light onto the detector; converting, by the detector, the light into an electrical signal; processing the electrical signal by the display; and converting, by the display, the electrical signal into a visible image. It is contemplated that removing aberrations in an acquired image from imperfect imaging optics can occur between the detector and the display so that the display shows the reconstructed image or the acquired image.

The properties of an imperfect imaging system can be described by various factors that can include resolution, contrast, noise, distortion, and the like. The resolution of an imaging system is its ability to distinguish between two closely spaced objects. It is measured in terms of the smallest angle between two objects that can be resolved. The contrast of an imaging system is its ability to reproduce the range of brightnesses in an image. It is measured in terms of the ratio of the brightest and darkest parts of an image. The noise in an imaging system is unwanted signal that is added to the image. It can be caused by a variety of factors, such as thermal noise, shot noise, and read noise. The distortion of an imaging system is the alteration of the shape or size of objects in an image. It can be caused by a variety of factors, such as lens aberrations, vignetting, and geometric distortion.

Imperfect imaging systems can be used for a variety of applications, such as photography, microscopy, and medical imaging. They can also be used for scientific research, such as astronomy and astrophysics.

Exemplary imperfect imaging systems include: a camera lens with aberrations that does not perfectly reproduce the image of an object. This can cause the image to be blurry or distorted. A digital camera with noise will add unwanted signal to the image. This can make the image look grainy or noisy. A microscope with distortion will not perfectly reproduce the image of a small object. This can cause the image to be stretched or squeezed.

Bayesian inversion is a statistical method for solving inverse problems. In an inverse problem, the goal is to infer the state of a system from indirect measurements. For example, in medical imaging, the goal is to infer the shape and composition of an object from X-ray or MRI measurements. Bayesian inversion is based on the Bayes theorem, which is a mathematical formula for updating the probability of a hypothesis given new evidence. In the context of inverse problems, the hypothesis is the state of the system, and the evidence is the measurements. The Bayesian inversion algorithm can include various components, including selecting a prior distribution for the state of the system, wherein the distribution reflects prior knowledge about the system; computing a likelihood function that gives the probability of the measurements given the state of the system; computing a posterior distribution that provides the probability of the state of the system given the measurements and the prior distribution; or sampling from the posterior distribution to obtain a set of possible states for the system.

Bayesian inversion is a tool for solving inverse problems that incorporates prior knowledge about the system into the solution and is able to handle noisy measurements.

The process for removing aberrations in an acquired image from imperfect imaging optics can include a conjugate gradient method. The conjugate gradient method is an iterative method for solving systems of linear equations. It is a very efficient method for solving large sparse systems of linear equations and can be used in the solution of partial differential equations.

In general, the conjugate gradient method is based on minimizing the quadratic form $\|Ax-b\|^2$, where A is the coefficient matrix, b is the right-hand side vector, and x is the solution vector. The method starts with an initial guess for x, and then iteratively updates x to minimize the quadratic form. The updates are made in a way that guarantees that the search directions are conjugate with respect to the coefficient matrix, which means that they are orthogonal to each other. This property ensures that the method converges to the solution in a finite number of steps.

A transfer function is a mathematical function that describes the relationship between the input and output of a system. In Bayesian inference, the transfer function is used to describe the relationship between the prior distribution and the posterior distribution. The transfer function is given by the following equation:

$$P(x \mid y) = \frac{P(y \mid x)P(x)}{P(y)}$$

where $P(x|y)$ is the posterior distribution, $P(y|x)$ is the likelihood function, $P(x)$ is the prior distribution, and $P(y)$ is the marginal likelihood. The transfer function can be interpreted as the probability of observing the data y given the prior distribution $P(x)$. It can be used to update the prior distribution to obtain the posterior distribution.

The transfer function has a number of properties. First, it is a probability distribution that that satisfies the axioms of probability, such as the axiom of total probability. Second, it is non-negative so that the probability of observing the data is always non-negative. Third, it integrates to unity so that the sum of the probabilities of all possible outcomes is equal to unity. The transfer function, in Bayesian inference, can be used to update the prior distribution to obtain the posterior distribution. This can help improve accuracy of estimates and make estimates more robust to outliers.

As part of removing aberrations, a conjugate gradient can be used. The conjugate gradient method is a very efficient method for solving large sparse systems of linear equations. This is because the method only requires the matrix-vector product Ax to be evaluated at each iteration. This product can be evaluated very efficiently for sparse matrices, using techniques such as the sparse matrix-vector multiplication algorithm. The conjugate gradient method is also very robust. It can be used to solve systems of linear equations with ill-conditioned coefficient matrices. This is because the method uses a line search technique to ensure that the updates to x are made in a way that does not cause the solution to diverge.

The conjugate gradient method for determining a solution of a system of linear equations can include:

(1) Start with an initial guess for the solution vector $x_0$.
(2) Compute the residual vector $r_0 = b - Ax_0$.
(3) Set a counter $i=0$.
(4) Compute the search direction $d_0 = -A^T r_0$.
(5) Compute the step size $a_0$ by solving the equation $\|r_0 - a_0 d_0\|^2 = \min_a \|r_0 - ad_0\|^2$.
(6) Update the solution vector $x_1 = x_0 + a_0 d_0$.
(7) Compute the residual vector $r_1 = b - Ax_1$.
(8) Compute the search direction $d_1 = -A^T r_1$.
(9) Increment $i \rightarrow i+1$
(10) If $\|r_1\| < \epsilon$ or $i > i_{max}$, then stop. Otherwise, go to step 3.

In an embodiment, a conjugate gradient algorithm in the Python programming language is shown in FIG. 15. Here, an image is recovered from aberrated measurements. The variable names are selected to correspond to those of the optics problem at hand, not the standard symbols above.

The conjugate gradient method converges to the solution of the system of linear equations Ax=b in a finite number of steps. The number of steps depends on the condition number of the coefficient matrix A. For well-conditioned matrices, the conjugate gradient method converges in relatively few iterations. For ill-conditioned matrices, the conjugate gradient method can involve more iterations to converge.

Image recovery apparatus 200 and processes disclosed herein have numerous beneficial uses. Advantageously, image recovery apparatus 200 and processes disclosed herein overcome limitations and technical deficiencies of conventional devices and conventional processes. Indeed, conventional high-resolution microscope systems employ complex multi-element objective lenses for high resolution diffraction-limited performance. Image recovery apparatus 200 and processes disclosed herein can eliminate need for sophisticated high-cost objective lenses in many contexts and can include low cost, off-the-shelf objective lens in the imaging system, giving reduced losses and reduced complexity, wherein image recovery apparatus 200 and processes disclosed herein for digital aberration removal provide near-diffraction limited output images. For electron beam optics, image recovery apparatus 200 and processes disclosed herein simplify and economize conventional complex electron beam optics, such as described in H. H. Rose; Science and Technology of Advanced Materials 9 014107 (2016), which is incorporated by reference herein in its entirety.

Image recovery apparatus 200 and processes disclosed herein are adaptable, simple, effective, and applicable for a wide range of imaging strategies and requires no custom-designed, high-cost hardware. Accordingly, image recovery apparatus 200 and processes disclosed herein can be employed by optical engineers, biologists, hobbyist astronomers, quantum scientists, and the like. Image recovery apparatus 200 and processes disclosed herein have low losses, which is important for quantum measurements with applications in quantum control technology. Image recovery apparatus 200 and processes disclosed herein can be used in applications with significant constraints in the design of the optical system that preclude conventional optical engineering, such as compact imaging systems where space is at a premium, or electron imaging where the electron optics are provide by electric and magnetic fields making aberration compensation challenging.

The articles and processes herein are illustrated further by the following Example, which is non-limiting.

EXAMPLE

Self-Bayesian Aberration Removal Via Constraints for Ultracold Atom Microscopy

High-resolution imaging of ultracold atoms typically requires custom high numerical aperture (NA) optics, as is the case for quantum gas microscopy. These high NA objectives involve many optical elements each of which contributes to loss and light scattering, making them unsuitable for quantum back-action limited "weak" measurements. We employ a low cost high NA aspheric lens as an objective for a practical and economical—although aberrated—high resolution microscope to image 887 Bose-Einstein condensates. Here, we present a novel methodology for digitally eliminating the resulting aberrations that is applicable to a wide range of imaging strategies and requires no additional hardware. We recover nearly the full NA of our objective, thereby demonstrating a simple and powerful digital aberration correction method for achieving optimal microscopy of quantum objects. This reconstruction relies on a high-quality measure of our imaging system's even-order aberrations from density-density correlations measured with differing degrees of defocus. We demonstrate our aberration compensation technique using phase contrast imaging, a dispersive imaging technique directly applicable to quantum back-action limited measurements. Furthermore, we show that our digital correction technique reduces the contribution of photon shot noise to density-density correlation measurements which would otherwise contaminate the desired quantum projection noise signal in weak measurements.

In many fields of study—from biophysics and medicine to astrophysics and atomic physics—images are a key source of data, making high-quality imaging systems essential. In all cases experimenters desire the maximum possible information from their images: imaging apertures limit the detected information; system inefficiencies discard information; and aberrations obfuscate what is finally detected. In optics, sophisticated multi-element (and high cost) objectives are able to image objects with resolutions approaching fundamental limits. In many cases, either because of technical incompatibilities, conflicting requirements or simply expense, these objectives cannot be employed. In quantum gas experiments the object is an atomic sample encased in an ultra-high vacuum system that introduces aberrations and limits optical access. Here we describe a versatile microscope for cold-atom imaging that fully uses the available optical access with low-cost optical elements in conjunction with a novel image reconstruction method, giving a combined hardware/software system that recovers near-diffraction limited performance, i.e., uses the full NA of the lens.

Even "quantum gas microscopes", the highest resolution imaging systems employed in cold-atom experiments, use algorithmic reconstruction techniques. These systems employ custom designed, high numerical aperture (NA) objectives to detect individual atoms in optical lattices by detecting their incoherent fluorescence. The distribution of atoms can be reconstructed using algorithms similar to the CLEAN algorithm from radio astronomy that construct distributions of point sources that are most consistent with the data given the system's point spread function (PSF).

In the case of coherent imaging, the observed aberrated images of cold atoms are related to the desired aberration-free images by multiplication of a contrast transfer function (CTF) in the spectral (Fourier) domain. Because the CTF can reduce or eliminate the signal at some wavevectors, information is lost and direct inversion is not possible. This can be resolved with a pseudo-inverse that uses a Bayesian prior in the vicinity of wavevectors with large information loss, but the resulting reconstructions suffer from artifacts and added noise.

Inspired by the application of constraints to the phase retrieval problem in optics, we present a new and versatile method that reduces artifacts in reconstructed images, while increasing the signal-to-noise ratio (SNR). Spatially compact systems have a finite spectral width. In the vicinity of the zeros in the CTF, our method effectively uses as a prior the weighted average of data from nearby wavevectors that are unresolvable given the system's assumed spectral width. In this sense, data from the same image effectively serve as a Bayesian prior for nearby points in the same image. As such we have introduced a finite size constraint to the problem of refocusing and correcting aberrations in images of ultracold atoms.

In many cold-atom experiments further information is contained in density fluctuations often parameterized by the power spectral density (PSD). Example sources of correlations include thermal noise at finite-temperature, quantum fluctuations at zero temperature, or quantum projection noise from the measurement process. Other noise sources parasitically contribute to the PSD in experiments, and in our case photon shot noise is the largest such contributor. In perfect imaging systems, this can be minimized by first windowing the data to contain only the region with atoms; however, in defocused or highly aberrated systems the atom signal is dispersed over much of the sensor and windowing becomes impractical. We show that our aberration correction method overcomes this: by correcting for aberrations we first recover near-perfect images that then can be windowed to minimize the contribution of photon shot noise.

Our data consists of images of ultracold atom ensembles of roughly $10^5$ atoms that both phase-shift and absorb an illuminating probe beam. Together the absorption and phase shift encode the density of atoms integrated along the propagation direction of the probe beam giving a 2D image of atomic density that we denote as an abstract "data" vector d. We focus on linear imaging systems where, as we describe below, aberrations and losses can be encoded as a linear transform described by the operator H, the CTF. Here the actual measurement outcome m is related to the desired data via the linear transformation m=H d. For aberrated or lossy imaging systems, information is lost going from d to m making H non-invertable, or leading to noise amplification.

We therefore face an ill-posed inverse problem and instead seek the pseudo-inverse $H^{(PI)}$ that most faithfully recovers $d \approx H^{(PI)}m$. For example, the expression $$H^{(PI)}(\alpha) = \frac{1}{H^\dagger H + |\alpha|^2} H^\dagger \qquad (1)$$

defines a Tikhonov pseudo-inverse. The eigenvalue expansion for $H^\dagger H$ indicates that $|\alpha|^2$ introduces a minimum eigenvalue into the denominator of Eq. (1), thereby avoiding singular behavior when any eigenvalue of $H^\dagger H$ becomes zero. Wiener deconvolution in signal processing is an example of a Tikhonov pseudo-inverse, where different values of $|\alpha|^2$ are associated with each eigenvalue of $H^\dagger H$. Here, we derive a pseudo-inverse of the Tikhonov form by combining a noise model of the measurement process with a Bayesian prior for the density distribution, asserting that the distribution is confined in a compact region of space.

This paper is organized as follows: in Sec. 1 we present a basic description of light propagating through a dilute atomic cloud. Next, in Sec. 2 we provide a unified description of imaging cold-atom clouds, and identify absorption and phase contrast imaging methods in suitable limits. In Sec. 3, we discuss our aberration correction algorithm and test it on simulated data. In Sec. 4, we describe our microscope for imaging $^{87}$Rb Bose-Einstein condensates (BECs) and detail our implementation of phase contrast imaging. Lastly, in Sec. 5, we apply our regularization method to experimental data and compare with existing techniques, and demonstrate the utility of our method by non-destructively imaging the thermal to BEC phase transition in-situ.

Fundamentals of Light Wave-Matter Interactions

The majority of ultracold atom measurements rely on images of light that has interacted with an atomic ensemble. As such, this section summarizes the theoretical description of laser light propagating along $e_z$ through a dilute atomic cloud: a nonpermeable dielectric medium. We relate the absorption and phase shift of the incident laser to a fundamental quantity in ultracold atom experiments: the 2D column density $\rho_{2D}(r_\perp)=\int\rho(r)dz$, where $\rho(r)$ is the 3D atomic density with spatial coordinates $r=xe_x+ye_y+ze_z$ and transverse coordinates $r_\perp=xe_x+ye_y$.

The Paraxial Helmholtz Equation

We consider a monochromatic laser with wavelength $\lambda$, wavenumber $k_0=2\pi/\lambda$, and angular frequency $\omega_0=ck_0$ propagating in a medium with complex relative permittivity $\varepsilon(r)=\epsilon/\epsilon_0$. Here c is the free-space speed of light; $\epsilon$ is the permittivity; and $\epsilon_0$ is the electric constant. The optical electric field $\varepsilon(r)$ is described by the vectorial wave equation $$\nabla^2\varepsilon(r) + k_0^2\varepsilon(r)\varepsilon(r) = -\nabla[\varepsilon(r)\cdot\nabla\ln\varepsilon(r)]. \quad (2)$$

The right-hand side of Eq. (2) can be omitted when $\varepsilon(r)$ is slowly varying. Since we consider an incident laser beam traveling along $e_z$, we isolate the z derivative to obtain the scalar wave equation $$-\frac{\partial^2\varepsilon(r)}{\partial z^2} = [\nabla_\perp^2 + k_0^2]\varepsilon(r) + k_0^2\chi(r)\varepsilon(r), \quad (3)$$

for each polarization. Here $$\nabla_\perp^2 = \partial^2/\partial x^2 + \partial^2/\partial y^2$$

is the transverse Laplacian and $\chi(r)=\varepsilon(r)-1$ is the relative susceptibility. Next, we assume that the variations of the field along $r_\perp$ are on a scale large compared to $\lambda$ and express the field as $\varepsilon(r_\perp,z)=E(r_\perp,z)e^{ik_0z}$ emphasizing the propagation axis $e_z$. Inserting this expression into Eq. (3) and making the paraxial approximation by dropping the $\partial^2E(r_\perp,z)/\partial z^2$ term, we obtain the paraxial Helmholtz equation $$-2ik_0\frac{\partial E(r_\perp,z)}{\partial z} = [\nabla_\perp^2 + k_0^2\chi(r)]E(r_\perp,z), \quad (4)$$

describing the paraxial wave field $E(r_\perp,z)$. In free space, with $\chi=0$, Eq. (4) is exactly solved by the differential operator $$K(\Delta z) = \exp\left(i\frac{\nabla_\perp^2}{2k_0}\Delta z\right), \quad (5)$$

that transforms a field at position z to position $z+\Delta z$ according to $E(r_\perp,z+\Delta z)=K(\Delta z)E(r_\perp,z)$ for any $\Delta z$. In the spectral domain $K(\Delta z)$ is diagonal, allowing free-space propagation to be implemented by simple scalar multiplication.

By contrast, no general solution exists when $\chi(r)\neq0$. However, for $\Delta z$ small compared to the depth of field $$(DoF)d_{dof} = 2k_0/k_{max}^2,$$

the operator $$R(\Delta z) = \exp\left[i\frac{k_0}{2}\int_z^{z+\Delta z}\chi(r)dz\right], \quad (6)$$

approximately transforms the field a distance $\Delta z$ via $E(r_\perp,z+\Delta z)\approx R(\Delta z)E(r_\perp,z)$. Where $k_{max}$ (bounded above by $k_0$) is the largest transverse wavevector in the detected optical field. $k_{max}$ is first set by the object plane field and then further limited by the NA of the imaging system (see Sec. 4). In the thin object limit $\delta z<<d_{dof}$, where $\delta z$ is the total thickness of the object, Eq. (6) gives the field $E(r_\perp,z+\delta z)$ just following the object without further consideration.

To describe the propagation of $E(r_\perp,z)$ through extended objects, Eq. (4) can be evaluated numerically, for example with split-step Fourier techniques. For this purpose, we divide the evolution into spectral and coordinate steps. The symmetrized expression $$E(r_\perp,z+\Delta z) \approx K(\Delta z/2)R(\Delta z)K(\Delta z/2)E(r_\perp,z) \quad (7)$$

is valid through second order in $\Delta z$, as can be readily derived from the Baker-Campbell-Hausdorff identity.

The optical field following the object $E_+$ travels through an imaging system to the image plane, where its time-averaged intensity $I_+(r)=c\epsilon_0|E_+(r)|^2/2$ (not field) is detected by a charge-coupled device (CCD). The time-average results from the fact that a typical $\gtrsim5$ μs imaging time is vast compared to the $2\pi/\omega_0$ optical period.

Depth of Field Effects

In this section, consider extended objects for which the thin object limit is inapplicable. A realistic object is present only in some compact domain from $z_-$ to $z_+$ along the axis of light propagation $e_z$. We divide the field into two components $$E_+(r_\perp,z) \equiv E_0(r_\perp,z) + \delta E(r_\perp,z) \quad (8)$$

where $E_0(r_\perp,z)$ describes the field with no object [$I_0(r_\perp,z)$ is the associated intensity] and therefore obeys the free space paraxial wave equation, and $\delta E(r_\perp,z)$ describes the light scattered by the object. We focus on the normalized scattered field $$f(r_\perp, z) = \frac{\delta E(r_\perp, z)}{E_0(r_\perp, z)}, \tag{9}$$

subject to the boundary condition $\delta E(r_\perp,z)=0$ for $z < z_-$. When the DoF of $E_0(r_\perp,z)$ greatly exceeds the $\delta z = z_+ - z_-$ extent of the object, $f(r_\perp,z)$ obeys $$i\frac{\partial f(r_\perp, z)}{\partial z} + \frac{1}{2k_0}[\nabla_\perp^2 + k_0^2 \mathcal{X}(r_\perp, z)]f(r_\perp, z) = -\frac{k_0}{2}\mathcal{X}(r_\perp, z),$$

a paraxial wave equation as in Eq. (4) with a source term. Although an arbitrary field can have $k_{max}$ up to $k_0$, a typical Gaussian probe beam has a large beam waist, giving small a $k_{max}$ with a large DoF. In the limit of small $\chi(r_\perp,z)$ and $f(r_\perp,z)$, we obtain the first order approximate expression $$i\frac{\partial f(k_\perp, z)}{\partial z} - \frac{1}{2k_0}k_\perp^2 f(k_\perp, z) = -\frac{k_0}{2}\mathcal{X}(k_\perp, z) \tag{10}$$

in the spectral domain. We implicitly indicate Fourier transforms by a wavevector such as $k_\perp$ as an argument. This expression is exactly solved by $$f(k_\perp, z_+) = \frac{ik_0}{2}\int_{z_-}^{z_+} \mathcal{X}(k_\perp, z)\exp\left[-i\frac{k_\perp^2}{2k_0}(z_+ - z)\right]dz. \tag{11}$$

In the following, consider an imaging system focused at $z=0$ and ask, "What infinitely thin object located at $z=0$ yields the same scattered field as an extended object does?" This is answered by first finding $f(k_\perp,z_+)$ ($z>z_+$ it obeys the free space paraxial equation), then back-propagating $f(k_\perp, z_+)$ to $z=0$, finally giving $$f_{eff}(k_\perp) = \frac{ik_0}{2}\int_{z_-}^{z_+} \mathcal{X}(k_\perp, z)\exp\left(+i\frac{k_\perp^2}{2k_0}z\right)dz. \tag{12}$$

Extending the bounds of integration to $\pm\infty$ converts the z integral to a 1D Fourier transform with a wavevector $$-k_\perp^2/2k_0,$$

leading to the final expression $$f_{eff}(k_\perp) = \frac{ik_0}{2}\tilde{\mathcal{X}}\left(k_\perp, \frac{k_\perp^2}{2k_0}\right) \equiv \frac{ik_0}{2}\mathcal{X}_{eff}(k_\perp). \tag{13}$$

The tilde in $$\tilde{\mathcal{X}}\left(k_\perp, k_\perp^2/2k_0\right)$$

emphasizes that the z index is Fourier transformed as well. Here we interpret the field $f_{eff}$ as resulting from an effective 2D susceptibility $\chi_{eff}(k_\perp)$.

In many cases of physical interest, the 3D susceptibility can be expressed in the separable form $\chi(r)=Z(z)\times\chi_{2D}(r_\perp)$, where $Z(z)$ is a normalized real valued longitudinal mode function. In this case $\chi_{eff}(k_\perp)=h_{dof}(k_\perp)\chi_{2D}(k_\perp)$ where, anticipating the notation that will be used in Sect. 2.3, we define the DoF contrast transfer function $$h_{dof}(k_\perp) \equiv \tilde{Z}\left(k_Z = -k_\perp^2/2k_0\right)$$

in terms of the Fourier transformed mode function, with $\tilde{Z}(0)=1$ implied by $Z$'s normalization. Throughout this paper we will take $Z(z)$ to be symmetric, implying $h_{dof}(k_\perp)=h_{dof}(-k_\perp)$ is real valued.

For the special case of a Gaussian mode function with $1/e$ width $w_z$, the DoF transfer function is $$h_{dof}(k_\perp) = \exp\left[-\frac{1}{4}\left(\frac{w_z}{d_{dof}}\right)^2\left(\frac{k_\perp}{k_{max}}\right)^4\right]. \tag{14}$$

As a consequence, the amplitude is suppressed for increasing $k_\perp$, but the phase is unaltered. At $k_{max}$ the suppression is $\exp[(-w_z/2d_{dof})^2]$, implying that there is negligible loss of information for objects appreciably thinner than the DoF, i.e., $w_z \ll d_{dof}$.

Atomic Susceptibility

For an ensemble of two-level atomic systems, the atom-light interaction is captured by the electric susceptibility $$\mathcal{X}(r) = \frac{\sigma_0}{k_0}\left[\frac{i - 2\bar{\delta}}{1 + \bar{I}(r) + 4\bar{\delta}^2}\right]\rho(r), \tag{15}$$

where $\bar{\delta}=\delta/\Gamma$ is the normalized detuning from atomic resonance in terms of the detuning $\delta=\omega_0-\omega_{ge}$ and the natural atomic linewidth $\Gamma$; $\hbar\omega_{ge}$ is the atomic transition energy; $\bar{I}(r)=I(r)/I_{sat}$ is the optical intensity in units of the saturation intensity $I_{sat}$; and $$\sigma_0 = 6\pi/k_0^2$$

is the resonant scattering cross-section.

The atomic susceptibility $\chi(r)$ is a complex quantity in which the real and imaginary parts result from distinct physical processes. The real part derives from stimulated emission (i.e., forward scattering) resulting in a dispersive atomic medium with a density dependent index of refraction. The imaginary part derives from spontaneous emission (i.e., nominally isotropic scattering) resulting in a density dependent absorption coefficient. As a result, the optical field will be phase shifted and attenuated as it travels through the atomic cloud. We correspondingly express the field just after interacting with the atomic medium $$E_+(r_\perp, z + \delta z) = e^{-\alpha(r_\perp) + i\phi(r_\perp)}E_0(r_\perp, z) \tag{16}$$

in terms of an absorption coefficient $$\alpha(r_\perp) = \frac{\sigma_0\rho_{2D}(r_\perp)}{2}\frac{1}{1 + \bar{I}(r_\perp) + 4\bar{\delta}^2} \tag{17}$$

19 and a phase shift $$\phi(r_\perp) = -2\bar{\delta}\alpha(r_\perp). \tag{18}$$

These are both proportional to the optical depth $$OD(r_\perp) \equiv -\ln\left[\frac{I_+(r_\perp)}{I_0(r_\perp)}\right] \tag{19}$$

via the relations $$\alpha(r_\perp) = \frac{OD(r_\perp)}{2} \tag{20}$$

and $$\phi(r_\perp) = -\bar{\delta}OD(r_\perp).$$

The 2D column density is related to the optical depth in terms of both the detuning and intensity $$\sigma_0\rho_{2D}(r_\perp) = \left[1 + 4\bar{\delta}^2\right]OD(r_\perp) + \bar{I}_0(r_\perp)\left[1 - e^{-OD(r_\perp)}\right]. \tag{21}$$

This expression shows that irrespective of how it was obtained, the optical depth serves to define the column density. In the limit of small optical depth, Eq. (21) reduces to $$\sigma_0\rho_{2D}(r_\perp) \approx \left[1 + \bar{I}_0(r_\perp) + 4\bar{\delta}^2\right]OD(r_\perp); \tag{22}$$

this could result from any combination of low density, large detuning or high intensity. For a spatially thin medium ($\delta z \ll d_{dof}$) and imaging with low intensity laser light ($I_0 \ll I_{sat}$) on resonance ($\delta = 0$), the optical depth following Eq. (21) is $OD(r_\perp) = \sigma_0\rho_{2D}(r_\perp)$.

Imaging Techniques with Cold Atoms

In this section, we describe two well-established imaging methods that are frequently employed in cold-atom experiments: phase contrast imaging (PCI) and absorption imaging (AI). We begin with the analysis of the general imaging scheme illustrated in FIG. 4, which includes a small phase shifter (phase dot) that is absent (i.e. gives 0 phase shift) for AI.

The object attenuates and diffracts the incident light, as described by Eq. (16), which can be re-expressed in terms of unscattered and scattered components. Using Eq. (8) this gives the object plane field $$E_+(r_\perp, z) \equiv E_0(r_\perp, z) + E_0(r_\perp, z)\left[e^{i\phi(r_\perp)-\alpha(r_\perp)} - 1\right]. \tag{23}$$

A phase dot shifts the optical phase of the unscattered light by $\theta$, giving the image plane field $$E_0'(r_\perp, z) = E_0(r_\perp, z)\exp(i\theta),$$

20 while leaving the scattered component unchanged. The resulting expression for the normalized image plane field after interacting with the atoms and the phase dot is $$\frac{E_+'(r_\perp, z)}{E_0'(r_\perp, z)} = 1 + e^{-i\theta}\left[e^{i\phi(r_\perp)-\alpha(r_\perp)} - 1\right]. \tag{24}$$

Equation (20) leads to the relation $$\frac{E_+'(r_\perp, z)}{E_0'(r_\perp, z)} = 1 + e^{-i\theta}\left\{\exp\left[-\left(\frac{1}{2} + i\bar{\delta}\right)OD(r_\perp)\right] - 1\right\} \tag{25}$$

between the normalized field and the optical depth. Experimentally we detect the intensities $$I_0'(r_\perp)$$

and $$I_+'(r_\perp),$$

the image plane intensities associated with the object plane intensities $I_0(r_\perp)$ and $I_+(r_\perp)$. Equation (25) leads to the normalized signal $$g_\theta'(r_\perp) = 2\cos(\theta) - e^{-OD(r_\perp)} - 1 + \tag{26}$$
$$2e^{-OD(r_\perp)/2} \times \left[\cos(\bar{\delta}OD(r_\perp)) - \cos(\theta + \bar{\delta}OD(r_\perp))\right],$$

where $$g_\theta'(r_\perp) \equiv 1 - I_+'(r_\perp)/I_0'(r_\perp).$$

This noninvertible expression is applicable to both AI and PCI.

In the following sections we derive the optical depth from this transcendental equation in limits appropriate for AI and PCI, and thereby leading to the column density through Eq. (21).

Phase Contrast Imaging

In 1932, Frits Zernike invented PCI as a phase sensitive imaging method utilizing the nonuniform refractive index of an object to reveal features that are invisible in other imaging techniques. Since then, PCI has found application in various fields as a noninvasive in-situ imaging method. In this section, we first introduce the basic principle of PCI and then derive the theoretical toolbox enabling a quantitative treatment of PCI in ultracold atom systems.

Principle of Phase Contrast Imaging

PCI is an interferometric technique sensitive to the phase shift of light having propagated through an object. The extensive application of the technique stems from the elegant simplicity of the required instrumentation. By imprinting a position dependent phase shift $\phi(r)$ onto the incident field, the object diffracts part of that light (see FIG. 4). PCI can be understood as an interferometer in which the unscattered component is the reference beam (the local oscillator) and the scattered component carries information about the object. These two components share the same optical path making PCI robust against vibrations in the imaging system.

Figure 4:
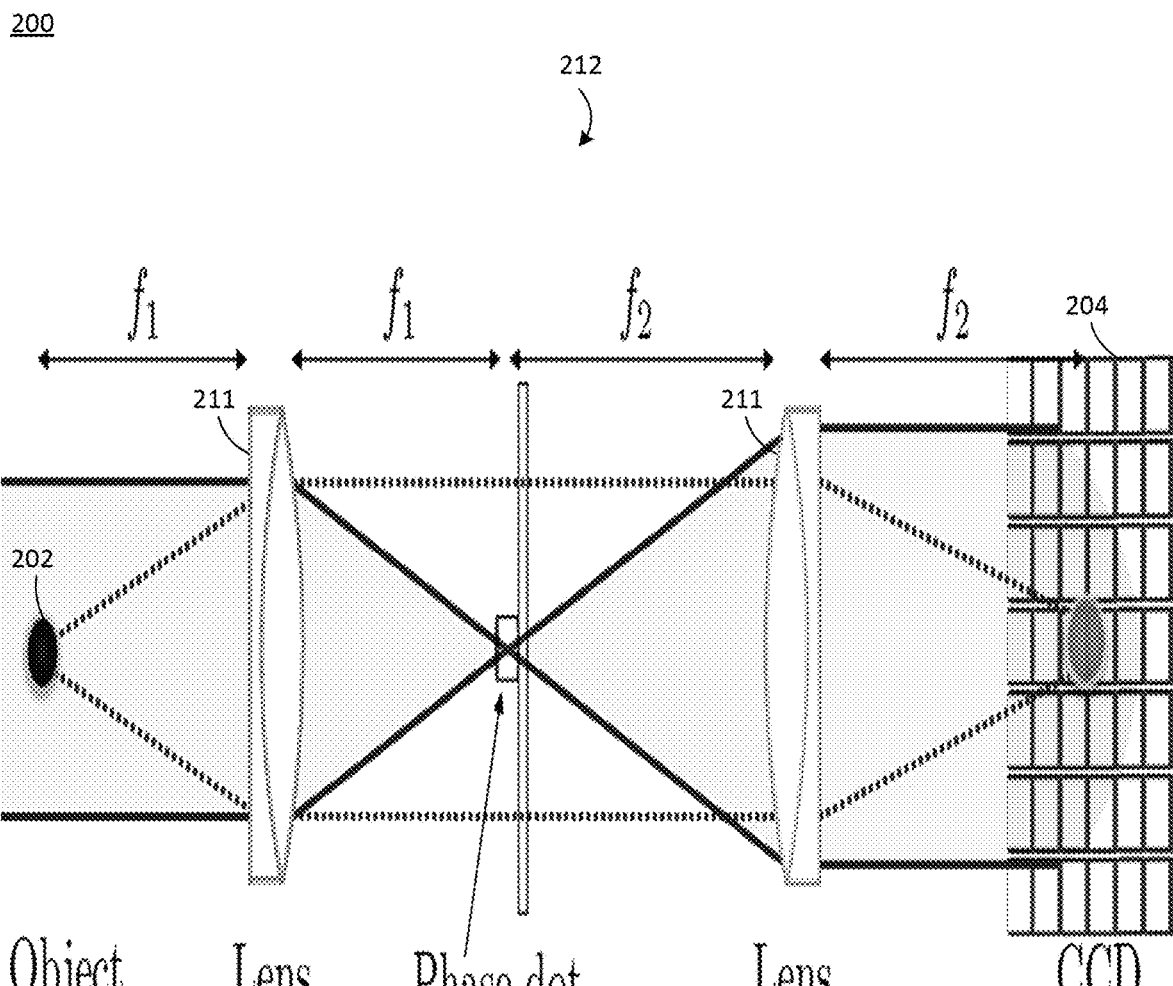
FIG. 4 shows, according to some embodiments, phase contrast imaging, wherein a refractive object scatters light from an incident probe laser into two components: unscattered (solid) and scattered (dashed). An objective lens placed a focal distance $f_1$ from the object spatially separates the two components at the back Fourier plane a distance $f_1$ from the lens. The phase dot is positioned at the Fourier plane and predominately phase shifts the unscattered light passing through it. After the second lens with focal length $f_2$ the two components interfere in the image plane and a CCD records the resulting intensity.

Both components are collected by an imaging lens that is positioned at its focal distance $f_1$ from the object. The unscattered light comes to an intermediate focus at the back Fourier plane of the lens, spatially separating the scattered and the unscattered components. A small dielectric dot (phase dot) just larger than the focused unscattered beam is positioned at the Fourier plane as shown in FIG. 4. The phase dot shifts the phase of the unscattered light by $\theta$ but leaves the scattered component unchanged. A second imaging lens with focal length $f_2$ forms an image plane where scattered and the unscattered components of the wave field interfere. At the image plane intensity is detected, with an overall magnification $M=f_2/f_1$.

Phase Contrast Imaging with Ultracold Atoms

The PCI intensity encodes information about the object-plane phase from which we extract the optical depth of the atomic cloud. In the limit of large laser detuning, where PCI is typically applied, we neglect absorption because $\alpha \ll \phi$. In this limit, Eq. (26) for the normalized intensity reduces to $$g'_\theta(r_\perp) = 2\{\cos\theta + \cos\phi(r_\perp) - \cos[\theta + \phi(r_\perp)] - 1\}. \quad (27)$$

In the limit of small phase shift (i.e., $\phi \ll 1$) the normalized PCI intensity $$g'_\theta(r_\perp) \approx 2\phi(r_\perp)\sin\theta \xrightarrow{\theta=\pi/2} 2\phi(r_\perp) \quad (28)$$

is linearly proportional to the phase shift imparted by the object and maximized for $\theta = \pi/2$. PCI yields an increased sensitivity for weak phase objects compared to other dispersive imaging methods. Lastly, we obtain the optical depth $$OD_{PCI}(r_\perp, \bar{\delta} \gg 1) = \frac{1}{2\bar{\delta}} g'_{\theta=\pi/2}(r_\perp) \quad (29)$$

using Eq. (20).

The minimally destructive nature of PCI measurement becomes evident for large detunings. In the limit $\delta \gg \Gamma$ while the phase shift imparted by the atomic system is $\propto 1/\delta$, the spontaneous emission rate is $\propto 1/\delta^2$. As a result, atom loss due to radiation pressure becomes negligible. Hence, in ultracold atom experiments PCI is typically employed to non-destructively image high column density atomic clouds in-situ and at large detuning.

Absorption Imaging

AI of ultracold atoms usually employs resonant or near-resonant laser light, i.e., $|\delta| \lesssim \Gamma$, where the spontaneous scattering of photons creates a shadow in the outcoming light wave. We measure this shadow and infer the column density of the object from the resultant images.

The imaging system in FIG. 4, introduced in the context of PCI, is applicable to AI provided the phase dot is removed. Accordingly, we apply the formalism in Eq. (26), with $\theta=0$. The on resonance ($\delta=0$) optical depth in terms of the detected normalized intensity in the image plane is $$OD_{AI}(r_\perp) = -\ln[1 - g'_{\theta=0}(r_\perp)]. \quad (30)$$

Partial Transfer Absorption Imaging

The high-optical density of most BECs prevents the direct observation of their density in-situ using standard AI. Dense clouds absorb the vast majority of the incident probe laser, leading to ODs greatly in excess of 1. This compromises the SNR, and in practice, background light and the dynamic range of typical CCDs limit AI measurements to $OD \lesssim 4$. Although detuning the probe beam reduces the atomic cross-section, the cloud behaves like a gradient index lens leading to imaging distortions. Dispersive imaging techniques such as PCI, dark-field imaging and Faraday imaging can operate at large detuning $\delta \gg \Gamma$, where phase shifts are small and lensing effects are thereby reduced. Partial transfer absorption imaging (PTAI) is an alternate approach for imaging high density atomic ensembles. In PTAI, an RF or microwave pulse transfers a fraction of the atoms from a dark state to a bright detection state where they are absorption imaged. In this way, PTAI mitigates large OD effects and can yield minimally destructive repeated images of the same atomic system.

In our specific experiment PTAI has additional quantum projection noise effects. For deeply degenerate interacting BECs, number fluctuations are greatly suppressed; the RF/microwave transfer process in PTAI then leads to enhanced atom shot noise similar to how a beam splitter introduces vacuum port noise in quantum optics. In Sec. 5.1 we utilize this fact when measuring the pupil function of our microscope.

Aberrations

Here we model aberrations as a Fourier pupil function that both phase-shifts and attenuates the optical field as a function of wavevector. Importantly, this model can only treat aberrations where the PSF—the magnitude squared of the impulse response function—is the same everywhere in the observed field of view.

Motivated by our introduction of regularization, we introduce the forward transfer function $$h_E(k_\perp) = e^{-\gamma(k_\perp)+i\beta(k_\perp)}, \quad (31)$$

describing the navigation of fields through our imaging system (neglecting the PCI phase dot) via $$E'_{+/0}(k_\perp) = h_E(k_\perp)E_{+/0}(k_\perp).$$

Here $\gamma(k_\perp)$ describes attenuation and $\beta(k_\perp)$ describes phase shifts. Even ideal imaging systems will have contributions from these terms. For example, defocus will contribute a quadratic $$\beta \propto k_\perp^2$$

term, and the NA limits the maximum accepted wavevector to $k_{NA}=NA \times k_0$, implying $\gamma(k_\perp) \to \infty$ for $|k_\perp| > k_{NA}$.

In our discussion of PCI, we assumed that the field $E_0(r_\perp)$ with the atomic ensemble absent is slowly varying and therefore contains Fourier components only near $k_\perp=0$. Thus following the imaging system it is transformed to $$E'_0(r_\perp) = h_E(0)E_0(r_\perp).$$

Including the impact of the phase dot as well as DoF effects introduced in Sect. 1.2, we arrive at the image-plane field ratio $$f'(k_\perp) = h_{dof}(k_\perp) \frac{h_E(k_\perp)}{h_E(0)} \frac{\delta E(k_\perp)}{E_0(r_\perp)} e^{-i\theta}. \tag{32}$$

Linearizing Eq. (23)_connects the image-plane field ratio to the optical depth via $$f'(k_\perp) = h_{tot}(k_\perp)OD(k_\perp), \tag{33}$$

in terms of the total transfer function $$h_{tot}(k_\perp) = \sqrt{\frac{1}{4} + \bar{\delta}^2}\, h_{dof}(k_\perp) \frac{h_E(k_\perp)}{h_E(0)} e^{i(\varphi-\theta)}. \tag{34}$$

Here $\varphi$, defined via $\tan \varphi = 2\bar{\delta}$, describes the complex angle associated with the atomic susceptibility. We see that the $k_\perp=0$ contributions to the pupil function have no impact, implying that any inferred dc component to the pupil function only results from detuning and the PCI phase shift as parameterized by $\varphi - \theta$.

Expressing this ratio as an intensity in coordinate space and converting back to the spectral domain gives $$g'(k_\perp) = \frac{h(k_\perp)}{[h_{tot}(k_\perp) + h_{tot}^*(-k_\perp)]} OD(k_\perp), \tag{35}$$

where the quantity in square brackets is the contrast transfer function that encodes the optical depth as a change in fractional intensity.

This expression takes on a more conventional form when $\gamma$ and $\beta$ are expressed in terms of their symmetric and anti-symmetric contributions, i.e., $\gamma_\pm(k_\perp)=[\gamma(k_\perp)\pm\gamma(-k_\perp)]/2$, and making the reasonable assumption of symmetric attenuation ($\gamma_-=0$). Then we obtain $$h(k_\perp) = \sqrt{1 + 4\bar{\delta}^2}\, h_{dof}(k_\perp)e^{-\gamma_+(k_\perp)+i\beta_-(k_\perp)} \times \cos[\beta_+(k_\perp) + \varphi - \theta]. \tag{36}$$

For absorption imaging ($\theta=0$) of thin objects [$h_{dof}(k_\perp)=1$] with no loss ($\gamma=0$) and a quadratic phase shift $$\beta = zk_\perp^2/2k_0,$$

we arrive at the well-known result $$h(k_\perp) = \cos(zk_\perp^2/2k_0) + 2\bar{\delta}\sin(zk_\perp^2/2k_0),$$

which results from defocus by a distance z [see Eq. (5)]. Furthermore, our result shows that up to an overall sign far detuned PCI with $|\varphi|=|\theta|=\pi/2$ obeys the same CTF as resonant AI.

These pupil functions can be calibrated using the fluctuations $\delta OD(r_\perp) \equiv OD(r_\perp) - \langle OD(r_\perp) \rangle$, where $\langle \ldots \rangle$ denotes the average over an ensemble of images of cold atoms. Assuming spatially uncorrelated density correlations, i.e., $\langle \delta OD(r)\delta OD(r')\rangle \propto \delta^{(3)}(r-r')$, where $\delta^{(3)}(r_\perp)$ denotes the 3D Dirac delta function, the power spectral density is $$\langle |\delta OD(k_\perp)|^2 \rangle \propto \tag{37}$$

$$e^{-2\gamma_+(k_\perp)}\{\cosh[2\gamma_-(k_\perp)] + h_{dof}(k_\perp)\cos[2\beta_+(k_\perp) + 2(\varphi - \theta)]\}.$$

This signal is sensitive to all components of the pupil function except $\beta_-$. In Sec. 5.1, we use this signal obtained at a range of image planes to extract low noise maps of the pupil function.

Signal-to-Noise Ratio

In this section we compare the SNR of PCI and AI. In our measurements, we detect probe pulses of duration $\Delta t$ on a CCD sensor of square pixel size $\Delta x$ and quantum efficiency q. The intensity at pixel coordinates i is $I_i=N_i I_{pe}$, where $N_i$ is the number of photo-electrons and $I_{pe}=\hbar\omega_0/\eta A\Delta t$ is the intensity required to generate a single photo-electron given the single-photon energy $\hbar\omega_0=c\hbar k_0$. In a single experimental shot, our measurement techniques employ three images that yield (1) $I_{+,i}$ of the probe in the presence of atoms, (2) $I_{0,i}$ of the probe field without the atoms, (3) $I_{D,i}$ with no probe light. For the remainder of the manuscript, we will omit the prime notation that distinguishes the image plane from the object plane. We subtract $I_{D,i}$ from $I_{+,i}$ and $I_{0,i}$ to eliminate any baseline from background illumination.

In bright field detection techniques, photon shot noise is the dominant source of noise, thereby we neglect other sources of technical noise such as dark current and read noise. Photon counting can be modeled as a classical Poisson process where individual photon detections are treated as independent events with an uncorrelated temporal distribution. Photon shot noise (more specifically the shot noise of the detected photo-electrons) explains the width of this distribution, which has its variance equal to its mean. We model each detected image $I_i=\langle I_i \rangle + \delta I_i$ as the sum of its mean $\langle I_i \rangle$ and measurement noise $\delta I_i$ (we will only consider zero mean random variables, i.e., $\langle \delta I_i \rangle = 0$). Then the spatially uncorrelated photon shot noise is described by $$\langle \delta I_i \delta I_{i'} \rangle = \delta_{i,i'} I_{pe} \langle I_i \rangle, \tag{38}$$

where $\delta_{i,i'}$ is the Kronecker $\delta$ function. Next, we consider the noise in the fractional intensity $g_\theta$. In practice, we construct the background image $I_{0,i}$ by averaging many images of the probe beam with no atoms present, and as a result it contributes negligible photon shot noise. With this assumption and following Eq. (38), the noise in the fractional intensity is $$\langle \delta g_i \delta g_{i'} \rangle = \delta_{i,i'} \frac{I_{pe}}{I_{0,i}} [1 - \langle g_i \rangle]. \tag{39}$$

Assuming that both the phase shift and OD are small, the noise variance of the OD deduced from PCI using Eq. (29) is $$\langle \delta OD_i \delta OD_{i'} \rangle_{PCI} = \delta_{i,i'} \frac{1}{4\bar{\delta}^2} \langle \delta g_i^2 \rangle. \tag{40}$$

For AI using Eq. (30) noise variance is $$\langle \delta OD_i \delta OD_{i'} \rangle_{AI} = \delta_{i,i'} \frac{\langle \delta g_i^2 \rangle}{[1 - \langle g_i \rangle]^2}. \tag{41}$$

Together these expressions show that near resonance the SNR of AI exceeds that of PCI, while far from resonance PCI has the larger SNR. In addition, the noise variance for AI diverges at large optical depth (where $\langle g_i \rangle \to 1$) because the fractional photon shot noise increases with increasing absorption; this emphasizes the importance of PCI or PTAI for large OD systems.

Comparing the expressions for PCI and AI, we see that for fixed $I_{0,i}$ (fixed back-action on atoms) the noise variance in PCI is lower by a factor of $\bar{\delta}$ compared to that of AI for large detuning and small absorption, i.e., low optical depth. This implies that AI cannot be a back-action limited measurement in this limit.

Regularization

We consider the general inversion problem where the linear operator H describes a forward transformation to the measurement basis described by vectors m, according to m=H d, where we read m as the measurement outcome and d as the desired data. Our approach follows a Bayesian line of reasoning, where we include a pair of priors and seek the most likely vector d given these priors.

Bayesian Framework

Before moving forward, we introduce a Gaussian prior distribution function $$P_d(d; p, \Delta) \propto \exp\left[-\frac{(d-p)^\dagger \Xi^{-1}(d-p)}{2}\right], \tag{42}$$

giving the probability of finding the data vector d conditioned on knowing a prior p with confidence expressed by the covariance matrix $\Xi$. The diagonal entries of the covariance matrix $$\Xi_{jj} = \xi_j^2$$

derive from the conventional single-sigma uncertainties $\xi_j$. An analogous distribution $P_m(m_0; m, \Sigma)$ applies for measurements, giving the probability that the "true" measurement outcome was $m_0$ conditioned on having observed m and knowing the covariance matrix $\Sigma$, with diagonal entries $$\sigma_i^2.$$

By combining these expressions we obtain $$P(d) \propto P_d(d; p, \Xi) \times P_m\left(Hd; m, \sum\right), \tag{43}$$

the probability of finding the data vector d, with forward transform H d, conditioned on both p and m. Here we select the most likely d as our pseudo-inverse, i.e., we employ maximum likelihood estimation.

By taking $-2 \ln P(d)$ we recast the inversion problem as a minimization problem with the quadratic objective function $$E = \alpha^2 (d-p)^\dagger \bar{\Xi}^{-1}(d-p) + (Hd-m)^\dagger \bar{\sum}^{-1}(Hd-m). \tag{44}$$

Here we introduced normalized covariance matrices $$\bar{\Xi} = \Xi/\xi_{max}^2$$

and $$\bar{\sum} = \sum/\sigma_{min}^2,$$

where $$\xi_{max}^2$$

is the largest eigenvalue of $$\sigma_{min}^2$$

is smallest eigenvalue of $\Sigma$; and $$\alpha^2 = \sigma_{min}^2/\xi_{max}^2$$

will function as a regularization parameter. The first term in Eq. (44) describes the uncertainty-weighted difference between the prior p and the reconstruction d, and the second term measures the uncertainty-weighted difference between the measurements m and the prediction of the reconstruction H d.

The objective function can be simplified by making use of the Cholesky decomposition, where the symmetric covariance matrices are expressed as $$\bar{\sum} = C_\Sigma C_\Sigma^\dagger \text{ and } \bar{\Xi} = C_\Xi C_\Xi^\dagger.$$

This leads to the simplified objective function $$E = |Jd' - m'|^2 + \alpha^2 |d' - p'|^2 \tag{45}$$

in terms of a new operator $$J = C_\Sigma^{-1} H C_\Xi,$$

and new vectors $$m' = C_\Sigma^{-1} m, \quad d' = C_\Xi^{-1} d$$

and $$p' = C_\Xi^{-1} p.$$

Since Eq. (45) is a quadratic form it has a unique minimum, which we obtain by setting the gradient $$\nabla_{d'} E = 2\left[(\alpha^2 + J^\dagger J)d' - J^\dagger m' - \alpha^2 p'\right] \tag{46}$$

equal to zero, where $\nabla_{d'}$ is the gradient with respect to the d' vector. This gives the root $$d'_0 = (\alpha^2 + J^\dagger J)^{-1}(J^\dagger m' + \alpha^2 p') \tag{47, 48}$$

$$\rightarrow (\alpha^2 + J^\dagger J)^{-1} J^\dagger m'$$

where in the second line we selected the p'=0 null prior, thereby replicating the generic Tikhonov form presented in Eq. (1).

Specific Implementation

Having employed a standard Bayesian framework to obtain a maximum-likely reconstruction, we now specialize to our imaging application.

Our method uses this framework by adding new information: outside some window no atoms exist, but the atomic distribution within that window is completely unknown. We thereby accept the p=0 prior outside the window by setting $\xi_j \rightarrow 0$ in that region, and reject the prior inside the window by setting $\xi_j = 1$ with $\alpha \ll 1$, implying that $\Xi$ is diagonal in the final spatial basis. In principle $\Sigma$ includes all known sources of uncertainty: in our case only photon-shot noise in the detection system is significant, making $\Sigma$ diagonal in the initial detection basis. Lastly, we constrain our implementation to imaging imperfections described by Eq. (35), giving a forward transfer function $h_k$ that is diagonal in the spectral basis.

Typical images are on the scale of $\approx 10^3 \times 10^3$ pixels and therefore reside in a $\approx 10^6$ dimensional vector space. Since the resulting $10^6 \times 10^6$ matrices in Eq. (48) are too large to manipulate directly with today's desktop computers, in the following we describe implementations that do not require their explicit construction. For selecting a real-space grid large enough for artifact free reconstruction, in general, padding the measured image m can be involved.

Spectral Tikhonov from Uniform Uncertainties

In the special case of uniform uncertainties—with $$\sum\nolimits_{i_1, i_2} = \Xi_{i_1, i_2} = \delta_{i_1, i_2},$$

and $\alpha = \sigma/\xi$—it is natural to work in the spectral basis where H is diagonal and Eq. (48) reduces to $$d_k = \frac{h_k^*}{\alpha^2 + |h_k|^2} m_k. \tag{49}$$

This special-case expression is again of the Tikhonov form, but by contrast to the general solution in Eq. (48) it is diagonal in the spectral basis, making its deployment straightforward. In practice, the regularization parameter $\alpha$ is empirically chosen and this inversion approach has been previously used to correct for the quadratic order aberrations resulting from defocus in cold-atom systems] as well as electron microscopy of biological systems.

Ad Hoc Convolution Approximation

Motivated by the simplicity of Eq. (49), we now derive an approximation to Eq. (48) that can still be implemented by multiplication in the spectral basis.

We again assume uniform detection uncertainties, but now allow 5 to be a window function which is diagonal in real space (and therefore implemented by a convolution in the spectral basis via the Fourier convolution theorem). In the following discussion we use explicit summations rather than linear-algebra notation for an unambiguous presentation. These assumptions lead to the simplification $\Sigma_{k_2,k_3} \overline{\Xi}_{k_1 k_2} H_{k_2 k_3} m_{k_3} = \Sigma_{k_2} \Xi_{k_1 - k_2} h_{k_2} m_{k_2}$, allowing zero-gradient condition to be written as $$\sum_{k_2} (\alpha^2 \delta_{k_1 k_2} + \Xi_{k_1 - k_2} |h_{k_2}|^2) d_{k_2} = \sum_{k_2} \Xi_{k_1 - k_2} h_{k_2}^* m_{k_2}.$$

We then make the ad hoc approximation of pulling $d_k$ outside of the convolution, giving the simplified result $$d_k \approx \frac{\sum_{k_1} \Xi_{k - k_1} h_{k_1}^* m_{k_1}}{\alpha^2 + \sum_{k_1} \Xi_{k - k_1} |h_{k_1}|^2}. \tag{50}$$

The intuition behind this expression is that any zeros in the denominator are lifted by convolving with the Fourier transform of the window function—a smoothing process—thereby providing a form of regularization even for $\alpha = 0$, making this a self-Bayesian method where the data serves as its own prior. However, when the zeros of the CTF are broad in the spectral domain as compared to the inverse width of the window function, this method will still lack sufficient information to estimate the recovered function, and a non-zero value of a will be required.

With reference to FIG. 14, Algorithm 1 outlines the computational steps to implement the ad hoc convolution approximation. In this pseudo-code, the Fourier transform $FT_k(m_x)$ indicates that the resulting vector will have the momentum index k. Expressions such as $\Xi_x$ $IFT_x(|H_k|^2)$ describe element-by-element multiplication and do not follow the Einstein summation convention, which would contract this quantity to a scalar. We evaluate the required convolutions via the Fourier transform-convolutions theorem, and hence Algorithm 1 does not require the explicit construction of large matrices.

Full Method

In the full evaluation of Eq. (48), we employ a conjugate-gradient algorithm, an efficient method that can be implemented without explicit construction of large matrices.

With reference to FIG. 15, Algorithm 2 charts our conjugate gradient approach implementation. Using this method the objective function in Eq. (44) converges to within $\approx 0.1\%$ of its asymptomatic value within 50 iterations. We also implemented an adaptive step size gradient descent method with similar performance, but added complexity. Therefore, we use the conjugate gradient algorithm to implement the full method reconstruction, both for simulations and experimental data.

Numerical Comparison: Images

In this section we numerically compare the reconstruction methods described above: the conventional spectral "Tikhonov" method (Sec. 3.2.1), the ad hoc method (Sec. 3.2.2), and the full method (Sec. 3.2.3)].

We modeled PCI imaging of an anisotropic BEC with $1.2 \times 10^5$ atoms and Thomas-Fermi (TF) radii of $R_x=43.6$ µm and $R_y=3.5$ µm. In our model, we simulated the imaging system described in Sec. 4, with aberration coefficients given in FIG. 16, and used representative experimental measurement parameters (see Sec. 5); both photon and atom shot noise were included as Poisson random processes.

We use the same overall analysis procedure both for simulated and experimental data:

for each measurement j, obtain three raw images $$I_+^{(j)}, I_0^{(j)}, \text{ and } I_D^{(j)}$$

(for simulated data $$I_D^{(j)}$$

is not needed);

compute the averaged dark frame $$I_D = \langle I_D^{(j)} \rangle;$$

remove the averaged dark frame from the remaining images:

$$I_+^{(j)} \rightarrow I_+^{(j)} - I_D \text{ and } I_0^{(j)} \rightarrow I_0^{(j)} - I_D;$$

reduce noise and artifacts by reconstructing $$I_{PCA}^{(j)}$$

with principle component analysis (PCA) techniques from the full set of $$\{I_0^{(j)}\}_j.$$

For simulated data there are no imaging artifacts and $$I_{PCA}^{(j)}$$

is replaced with a modeled shot-noise noise-free probe; construct PCI signal $$g_{PCI}^{(j)} = 1 - I_+^{(j)}/I_{PCA}^{(j)};$$

except when otherwise stated, apply a Fourier window to $$g_{PCI}^{(j)}$$

describing the known aperture to eliminate photon shot noise present at wavevectors where no signal is present; and
optionally apply an image recovery technique to $$g_{PCI}^{(j)}.$$

Figure 5:
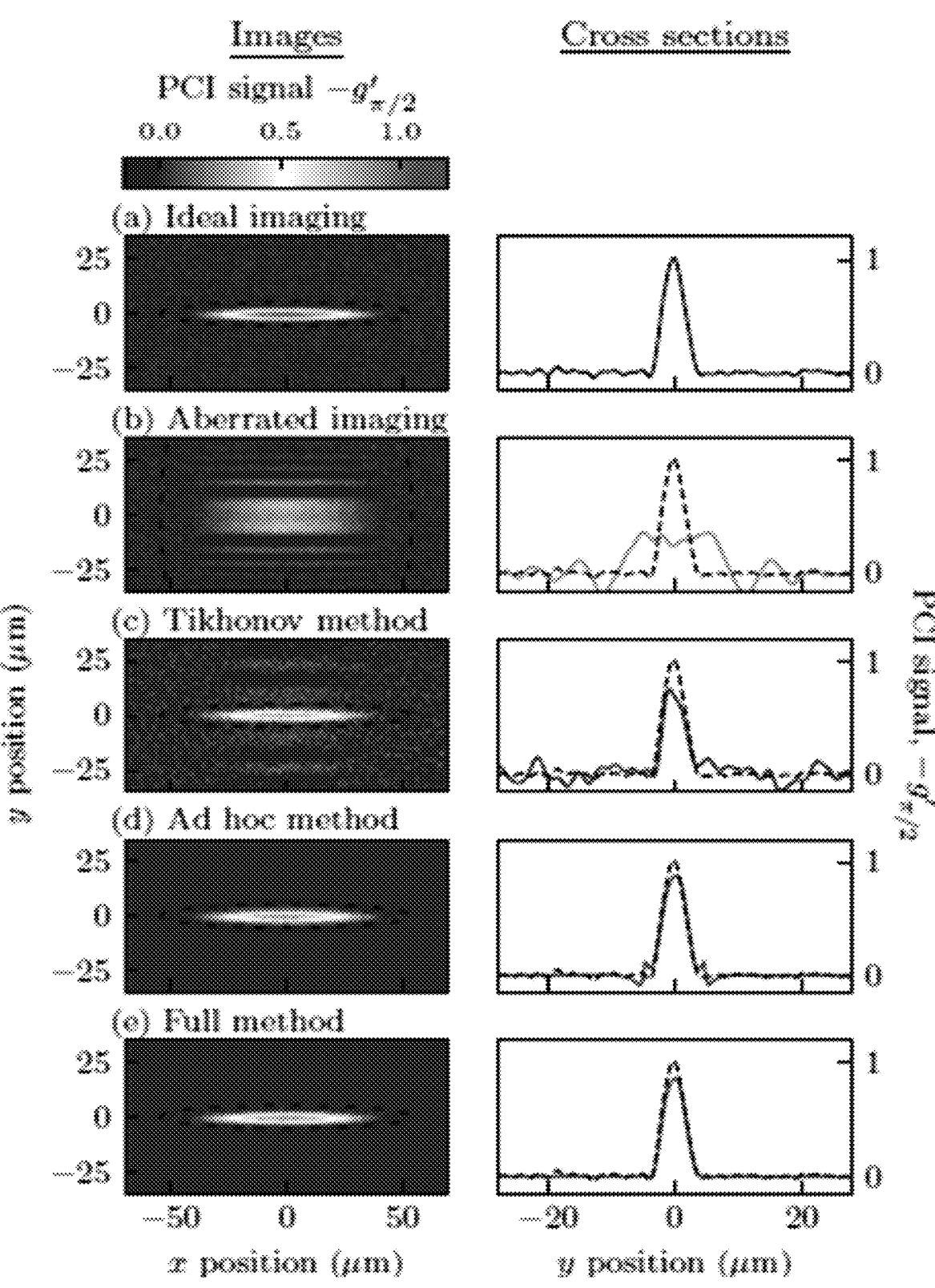
FIG. 5 shows, according to some embodiments, numerically modeled PCI images of $1.1 \times 10^5$ atoms in a 3D Thomas-Fermi distribution. Modeling included photon and atom shot noise and used parameters matching experiments with: probe detuning $\bar{\delta}=106$, intensity $\bar{I}=2.0$, overall system efficiency of 0.6 (corresponding to about 400 photo-electrons detected per pixel), a factor of $\sqrt{2}$ added noise from the EMCCD's electron-multiplication stage, and a 20 μs pulse duration. Full images are depicted in the left column and vertical cross sections are plotted in the right. (a) Image following an ideal NA-limited imaging system. (b) Aberrated image from an imperfect imaging system. (c) Reconstruction using the Tikhonov method with $\alpha=0.1$. (d) Reconstruction using the ad hoc method with $\alpha=0.1$. (e) Reconstruction using the full method with $\alpha=0.1$. The dashed curve in each cross section replots the ideal NA-limited case for reference and the dashed black ellipses denote real-space window functions that are relevant both for reconstruction (ad hoc and full method) as well as the computation of the PSD (ideal imaging, imperfect imaging, and Tikhonov method).

The left column of FIG. 5 depicts modeled PCI data under different conditions. Panel (a) begins by showing an image from an ideal NA-limited imaging system, while (b) introduces aberrations. Panel (c) shows that conventional Tikhonov reconstruction using $\alpha=0.1$ gives significant added noise and introduces small artifacts parallel to the main reconstitution. The regularization parameter $\alpha$ was selected to make the noise and artifacts similar in amplitude. Panels (d) and (e) show reconstructions from the ad hoc and full methods respectively, using an elliptical Tukey window with major and minor axes $(1.25 \times R_x, 1.5 \times R_y)$ depicted by black ellipses, and Tukey parameter 0.25. Both methods appear virtually indistinguishable from the ideal case in (a). The vertical cross sections plotted in the right column of FIG. 5 compare the uncorrected data and our three reconstruction methods to the ideal data in more detail; the regularization parameter $\alpha=0.1$ was used in all cases. The uncorrected data [(b) orange curve] bares virtually no resemblance to the true signal (dashed curve), while the reconstructed signals approximate the true signal with differing degrees of accuracy. The Tikhonov method [(c) blue curve] accurately recovers the overall shape of the desired distribution, but adds significant noise; increasing $\alpha$ decreases the added noise at the expense of reduced accuracy in the recovered signal. The ad hoc method [(d) green curve] has greatly reduced noise but introduces artifacts at the edge of the Thomas-Fermi distribution. Lastly, the full method [(e) red curve] retains the low noise of the ad hoc method while eliminating its artifacts, thereby recovering the true signal with even increased accuracy. We note that all three of these methods underestimate the PCI signal; this results from the small signal linearization leading to Eqs. (33) and (35). In principle this is not needed, but the resulting minimization problem is non-linear and beyond the scope of this paper.

Numerical Comparison: Correlations

Figure 6:
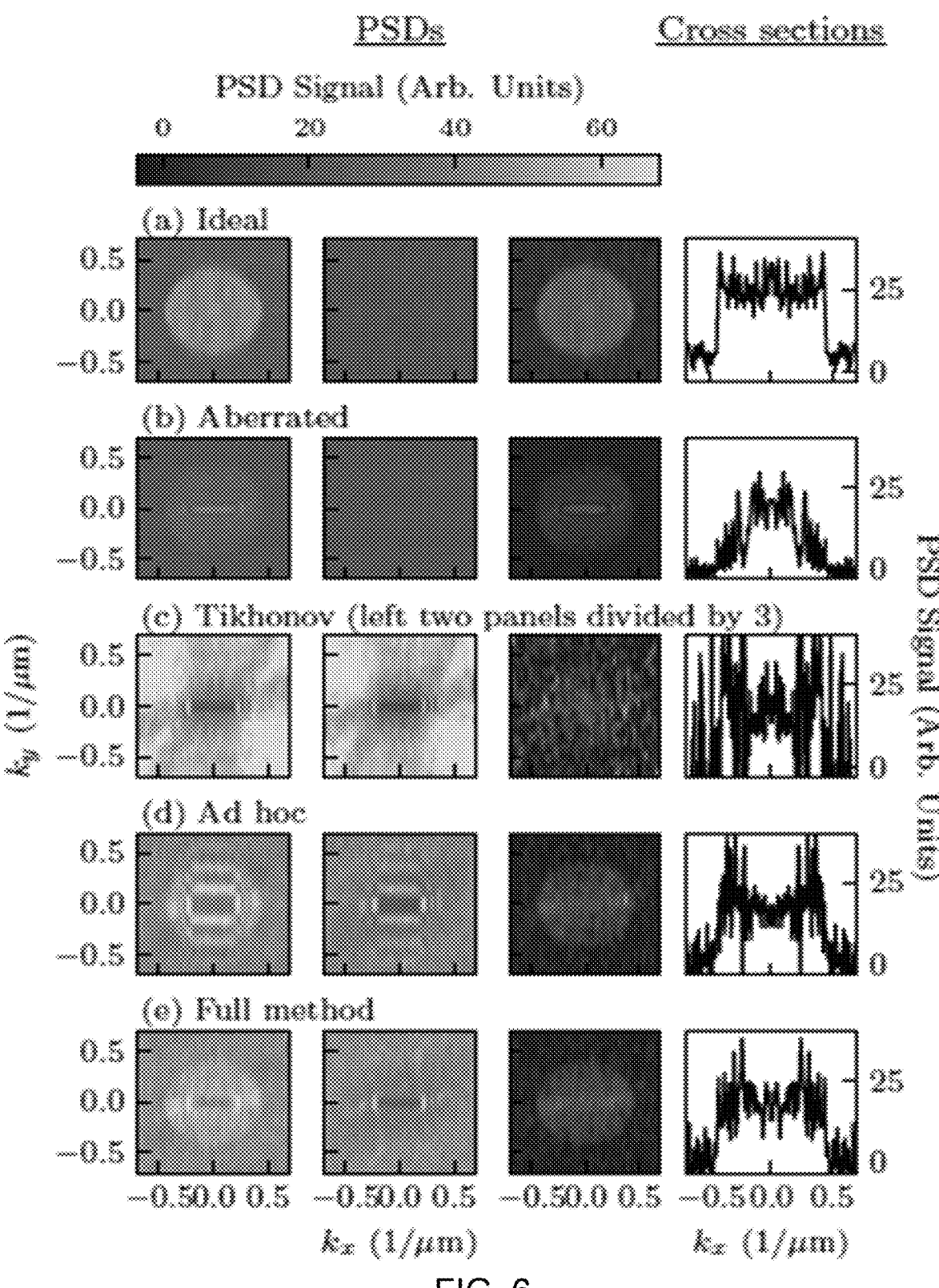
FIG. 6 shows, according to some embodiments, numerically modeled PSDs from images computed as in FIG. 5 averaged over 200 repetitions. The left column of figures plot the modeled PSD with atoms present; the next column is the PSD computed with no atoms; and the third column shows their difference. The right column plots a horizontal cross-section through the difference. (a) Ideal imaging system. (b) Aberrated imaging system modeling experimental imperfections. These data were processed with a window 10× larger along $e_y$. To compare with the remaining images, this data was simulated with a pulse duration increased by a factor of 10 to an unrealistic 200 μs. (c)-(e) show the PSD computed following Tikhonov, ad hoc, and full reconstructions, respectively.

Density-density correlations present in the fluctuations (noise) of cold-atom images can be directly related to the static structure factor. As established in the previous section, our ad hoc and full methods produce low noise reconstructions; this section takes the next step by analyzing correlations in these reconstructions. Here we quantify structure in the fluctuations in terms of the PSD given by $PSD(\delta d) \equiv \langle |FT(\delta d)|^2 \rangle$, where $\delta d = d - \langle d \rangle$ describes the fluctuations observed in a single experiment. Artifacts in the PSD introduced by imperfect imaging systems can be compensated for; however, previous work did not consider refocusing images. It is far from clear if refocusing techniques correct correlations, indeed, contrast transfer functions introduce correlations in otherwise uncorrelated noise, potentially rendering these methods unsuitable for correlation analyses. FIG. 6 illustrates the viability of these refocusing methods via simulations of systems with spatially uncorrelated atom shot noise giving uniform PSDs.

The left panel in FIG. 6(a) plots the PSD resulting from an ideal NA-limited imaging system evidencing signal within a central circle defined by the system's NA, i.e., $|k|<k_{NA}$. Outside this circle, the PSD takes on a non-zero background value from photon shot noise. The central image plots the PSD when no atoms are present, showing that the photon shot noise signal is constant: as is expected for spatially uncorrelated noise unaffected by the microscope's NA or aberrations. In these simulations the photon shot noise contribution is minimized by applying the elliptical Tukey window plotted in FIG. 5($a$). In this way, photon shot noise from regions with no atoms is eliminated. Lastly the right image plots the atom-signal alone, obtained by subtracting the PSD with no-atoms (photon shot noise only), from that with atoms (containing signal and photon shot noise). The final panel plots a horizontal cross-section illustrating the SNR≈10 of the correlations.

FIG. 6($b$) plots the same quantities computed for our aberrated imaging system showing the appearance of structure in the PSD from aberrations. These data required a real-space window function×10 larger along $e_y$ to capture the full diffraction pattern [FIG. 5($b$)]. To compensate for the added photon shot noise, we increased the imaging pulse duration from 20 µs to 200 µs. In practice this imaging time is unrealistically large, so further averaging would be required instead; this makes correlation analyses of highly aberrated PCI images impractical.

FIG. 6($c$)-($e$) addresses the degree to which our regularization methods recover the PSD of the ideal imaging system. FIG. 6($c$) shows that the Tikhonov method adds significant structure to the photon shot noise background as well as greatly reducing the SNR of the differenced PSD. By contrast, (d) and (e) show that the ad hoc and full methods imprint sequentially less structure to the photon shot noise and recover the ideal PSD with increased fidelity.

Figure 7:
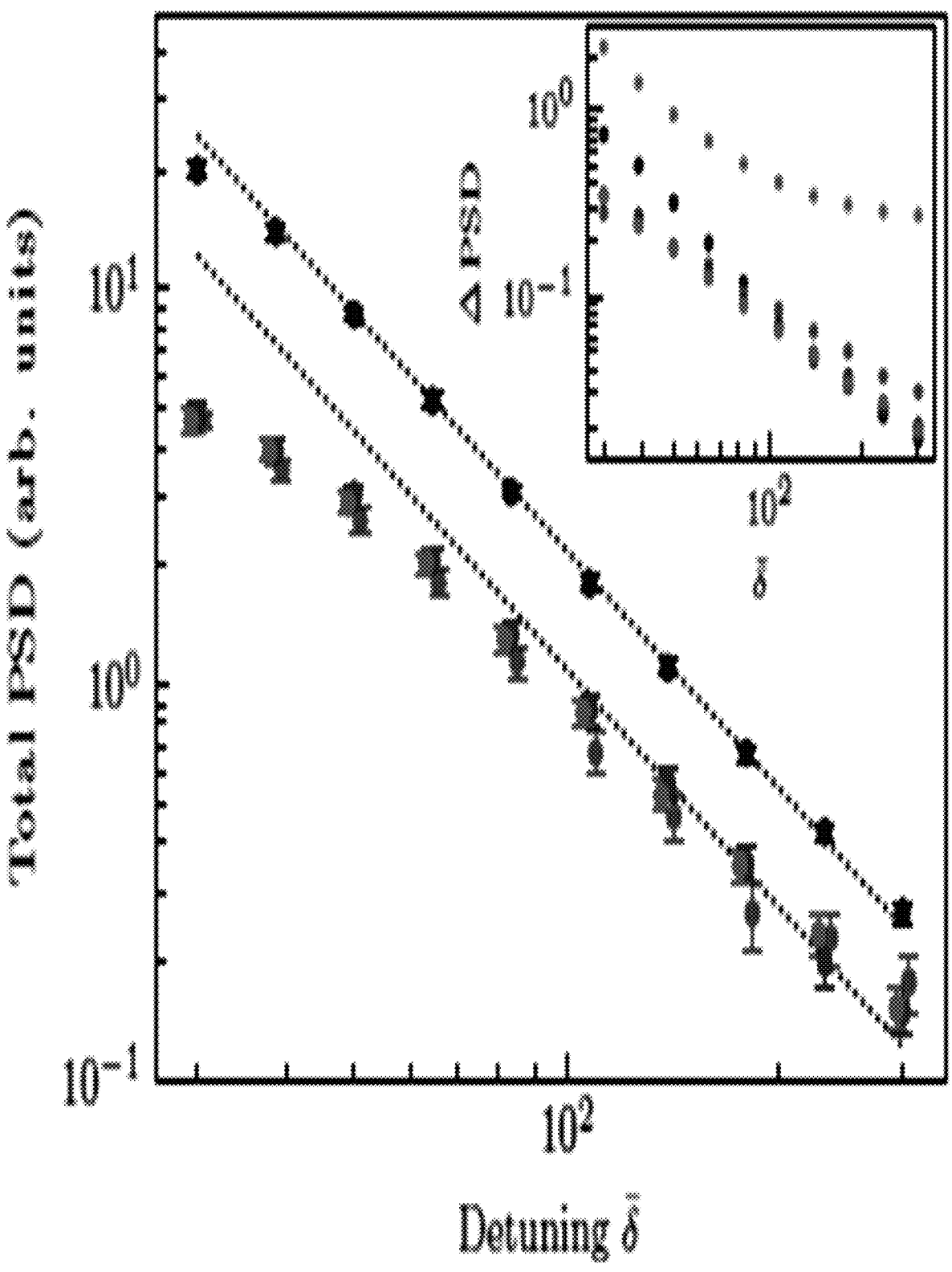
FIG. 7 shows, according to some embodiments, noise analysis of integrated PSD. Each symbol marks the PSD (computed as in FIG. 6) integrated within the NA-limited disk. The black, green, blue and red data respectively plot the results for ideal imaging, the Tikhonov method, the ad hoc method and the full method. The dashed lines show the expected $1/\bar{\delta}^2$ scaling of the PSD signal, with a factor of 2 scale factor between the lines. The inset plots the standard deviation ΔPSD of the integrated PSD over the ensemble of 200 images, with the grey data resulting from the aberrated case.

FIG. 7 plots the integrated PSD within the allowed NA window as a function of detuning δ along with a pair of dashed lines showing the expected $$1/\delta^2$$

scaling. All uncertainties herein reflect the uncorrelated combination of single-sigma statistical and systematic uncertainties. The dashed lines differ only by a factor of two, showing that the three reconstruction methods yield a signal about a factor of two below the ideal case, resulting from the actual information loss in the process of being aberrated. As was anticipated by the individual PSDs, the Tikhonov (green) method exhibits excess noise somewhat in excess of the ad hoc (black) and full (red) methods. The reduced PSD signal of the reconstructions at small δ result from the PCI signal $$g'_{\pi/2} > 1,$$

invalidating the small-signal approximation used in deriving the CTF. The inset plots the standard deviation ΔPSD of the integrated PSD over an ensemble of 200 images; all three reconstruction methods show similar noise performance at small δ, and as noted above the Tikhonov method shows excess noise at large δ. The grey symbols plot the noise of the aberrated real-space case, which owing to the ×10 larger real-space window function suffers from excess photon shot noise. The knee in the aberrated data results from a regime (small δ)

where atom shot noise is a significant contribution to a regime (large δ) where photon shot noise dominates.

Ultracold Atom Microscope

Figure 8:
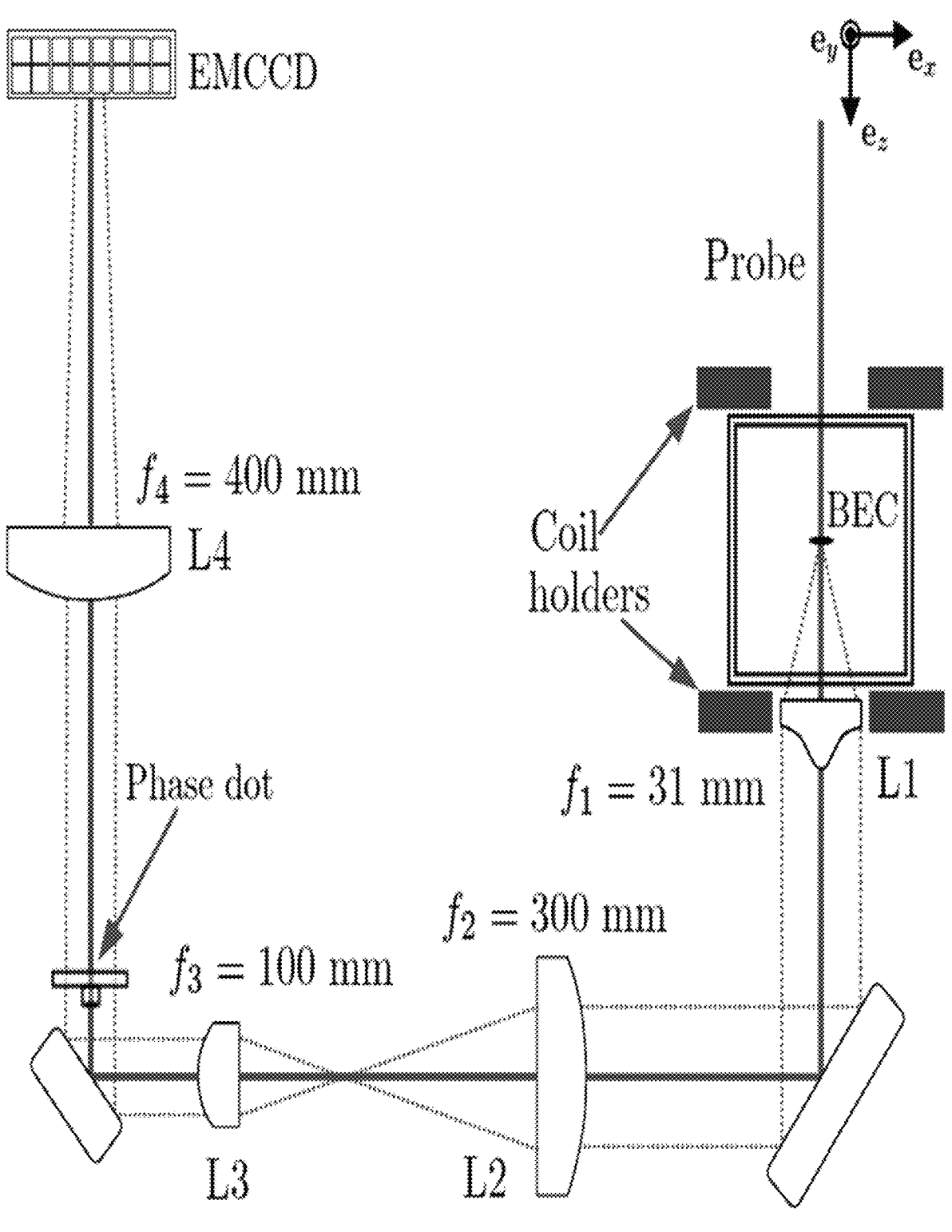
FIG. 8 shows, according to some embodiments, an ultra-cold atom microscope, wherein cold atoms are disposed in a vacuum system with a square cross-section glass cell with ≈50 mm sides. The NA=0.32 objective lens maximizes the NA given the constraint of the illustrated coil holders. Not shown are three additional dichroic mirrors that center the probe beam on the final lens and the EMCCD.

We imaged BECs at high resolution using an ultracold atom microscope based on a single low cost and high NA aspheric lens as the objective lens, shown in FIG. 8. The optical system consisted of back-to-back Keplerian telescopes with total magnification M=36.3. The first stage used an objective lens (L1, with focal length $f_1$=31 mm, Edmund Optics part number 49-115) with numerical aperture NA=0.32 (larger NA is not possible in our apparatus because of the coil holders shown in FIG. 8). The second lens (L2) with $f_2$=300 mm was an achromat with a 50.8 mm diameter, selected to minimize vignetting effects. The second Keplerian telescope consisted of a pair of lenses (L3 and L4) with focal lengths $f_3$=100 mm and $f_4$=400 mm. The resolution of our microscope, defined by the Rayleigh criterion, was diffraction limited with ≈0.61λ/NA=1.5 µm at the imaging wavelength of λ=780 nm. The Rayleigh criterion is the radius of the first minimum of the NA limited intensity pattern of an imaged point source, i.e., an Airy pattern. An electron multiplying CCD (EMCCD) with 1024×1024 square pixels (with 13 µm pixel size) was placed at the image plane located at the focus of L4, where a diffraction limited spot was about 4 pixels in radius. The electron multiplication stage in effect increases the shot noise by a factor of $\sqrt{2}$, for bright-field imaging this can be modeled as a reduction of the quantum efficiency by $\sqrt{2}$.

Our imaging system included an adjustable mask at the intermediate image plane, allowing us to image elongated atomic ensembles while leaving the majority of the sensor dark. This enables repeated minimally destructive (ideally quantum back-action limited) measurements of the same ensemble, using the "fast kinetics mode" available on some CCD sensors. All PCI images reported in this paper were taken with the mask fully open, i.e., non-masked and hence the mask is not shown in FIG. 8.

We implemented PCI using a 25.4 mm diameter phase plate (manufactured by Lexitek, Inc.) containing a phase dot 37 µm in radius and 19.5 µm thick. This plate was positioned at the Fourier plane of the second Keplerian telescope. The nominally Gaussian probe beam, i.e., light which has not been scattered by the atoms was focused by L3 to a 26 µm $1/e^2$ radius in the phase dot. By contrast the scattered light was confined to a much larger ≈3.8 mm radius disk. As a result, virtually all of the unscattered light traveled through the phase dot, while nearly none of the scattered light did.

EXPERIMENTAL RESULTS

We imaged highly elongated [87]Rb BECs in-situ using PCI and PTAI. The N=1.2(2)×10⁵ atom BECs were created in the $|F=1,m_F=1\rangle$ electronic ground state, and were confined in an elongated crossed optical dipole trap (ODT) with frequencies $(\omega_x, \omega_y, \omega_z)=2\pi\times[12.2(1),153.2(3),175.4(5)]$ Hz. We obtained N from the in-situ long-axis TF radius $R_x$=43.6 (9) µm, resulting in $R_y$=3.5(1) µm and $R_z$=3.0(1) µm. In addition we applied the Castin-Dum scaling theory to separately measured time-of-flight (TOF) images, and found N=1.9(3)×10⁵, which would imply an $R_x$=48(2) µm that is inconsistent with our in-situ observations.

Our probe laser couples the ground $|F=^2,m_F=2\rangle$ state to the excited $$|F' = 3, m'_F = 3\rangle$$

state. As a result, we transferred the atoms from $|F=1, m_F=1\rangle$ to $|F=2,m_F=2\rangle$ using a 68 μs resonant microwave pulse prior to PCI imaging. For PTAI we used a weaker microwave pulse to transfer≈10% of the population to $|F=2,m_F=2\rangle$. In both cases, the imaging pulse was 20 μs in duration and had intensity $I/I_{sat}≈2$, where $I_{sat}≈1.67$ mW/cm$^2$.

Our near-resonance "absorption imaging" measurements were altered by the presence of a phase dot in our microscope. The OD in this case is given by $$OD_{AI}(r_\perp) = \frac{1}{2\delta}g'_{\theta=\pi/2}(r_\perp), \qquad (51)$$

where we evaluated Eq. (26) assuming both OD<<1 and δ<<1. Interestingly this is the same expression as for PCI given in Eq. (29), although the resulting signal is from absorption not phase shift.

The remainder of this section proceeds as follows. First, we describe our experimental protocol extending Eq. (37) for characterizing the microscope's Fourier pupil function using PSDs obtained from near resonant PTAI images. We then contrast high-resolution PCI images of our BEC reconstructed using the standard Tikhonov method with those from our full method. We conclude by applying our full method to in-situ imaging of the thermal to BEC phase transition, which is difficult to resolve in our aberrated raw data.

Fourier Pupil Function Measurements

We experimentally characterized the Fourier pupil function of our ultracold atom microscope utilizing density-density correlations and the BEC's TF distribution. As discussed in Sec. 2.3, PSDs provide information about aberrations present in imaging systems. We extracted density correlations in the fluctuations of cold-atom images and obtained experimental PSD similar to the numerical model shown in FIG. 6 (b). The PSD contains no information about the anti-symmetric phase $\beta_-$ contributions to the pupil function, and instead we used the difference between the reconstruction and the expected TF distribution to constrain $\beta_-$.

Our strategy for measuring the Fourier pupil function via PSDs combines two critical elements to deliver increased precision. First, we obtained the PSD from in-situ PTAI images. As described in Sec. 2.2, PTAI introduces uncorrelated atom shot noise to deeply degenerate BECs; the observed PSDs then carry the imprint of our microscope's aberrations upon a featureless background. Second, we deliberately defocused our microscope by translating L4, the lens immediately preceding the EMCCD (see FIG. 8), away from the established focal position at $\delta z_{L4}=0$ cm. Changing the focus by a small distance z adds a quadratic phase shift $$zk_\perp^2/2k_0$$

to the pupil function as introduced in Sec. 2.3. Then PSD measurements taken at different image planes differ only in their $$k_\perp^2$$

terms. Consequently, by performing a joint fit to a family of such PSDs we quantified the imaging system's even-order aberrations with increased precision.

Correlations Fit Function

Following the aberration model discussed in Sec. 2.3, we employed a fit function that accounts for optical aberrations as well as unwanted "surface effects" (including reflections, along with losses within the optical elements), and aperture limits. The attenuation parameter $$\gamma_+(k_\perp) = \gamma_+^S(k_\perp) + \gamma_+^A(k_\perp)$$

describes the exit pupil apodization, where we have introduced surface and aperture contributions $$\gamma_+^S$$

and $$\gamma_+^A.$$

Because our imaging system is well aligned on the optical axis, we assume $\gamma_-(k_\perp)$ has no surface components, i.e., $$\gamma_-(k_\perp) \equiv \gamma_-^A(k_\perp).$$

These variables allow us to re-express Eq. (37) as $$\langle |\delta OD(k_\perp)|^2 \rangle \propto e^{-2\gamma_+^S(k_\perp)}\left\{\frac{1}{2}[A^2(k_\perp) + A^2(-k_\perp)] + \right. \qquad (52)$$
$$\left. h_{dof}(k_\perp)[A(k_\perp)A(-k_\perp)] \times \cos[2\beta_+(k_\perp) + 2(\varphi - \theta)]\right\},$$

where $A(k_\perp)\equiv e^{-\gamma^A(k_\perp)}$. We interpret $A(k_\perp)$ as a window describing the aperture. We model $A(k_\perp)$ as a boxcar window function that takes on values of either 1 (inside) or 0 (outside) so $A^2=A$. We empirically determined $A(k_\perp)$ based on prominent structures in the measured PSD that result from the known experimental geometry of our apparatus. The details of this procedure are given in the following section.

Second, we characterize the phase shift of the Fourier pupil function using the polynomial representation $$\beta(k_\perp) = \sum_{m,n} c_{mn}\left(\frac{k_x}{k_0}\right)^m\left(\frac{k_y}{k_0}\right)^n. \qquad (53)$$

The PSD depends on $\beta_+$, thus our fit function contains only symmetric terms, i.e., those with even m+n. We thereby model even-order aberrations such as astigmatism, defocus and spherical aberrations manifested in our microscope. Because our experimental aperture (described below) is not circular, the conventional Zernike basis has no particular meaning. While it would in principle be possible to construct an orthogonal polynomial basis for our aperture, we adopt a simple order-by-order polynomial expansion.

We performed a global fit of all $\langle |\delta OD(k_\perp)|^2 \rangle$ measurements discussed in the next section to Eq. (52) using the following criteria. The degree of defocus is quantified by $c_{20}$ and $c_{02}$, these change by the same amount as $\delta z_{LA}$ changes, but the remaining $c_{mn}$ are fixed. As a result, the global fit designates $c_{20}$ and $c_{02}$ as unshared parameters (constrained to change by the same amount as $\delta z_{LA}$ changes) while the remaining $c_{mn}$ are held constant across the data sets. We performed two supplementary measurements at $\delta z_{LA}=0$ by changing the detuning to $\delta \approx \pm 0.5$. Equation (52) shows that $c_{00}=(\varphi-\theta)$ results from detuning and the PCI phase shift. The fits to these supplementary measurements share all their parameters with the $\delta=0$ dataset except coo.

The surface term in Eq. (52) is independent of $\delta z_{LA}$ and $\delta$, and we represent it as a Gaussian using $$\gamma_+^S(k_\perp) = g_S^2\left[(k_x/k_0)^2 + (k_y/k_0)^2\right],$$

where $g_S$ is a shared fit parameter in our aberrations model. Finally, following Eq. (14), the DoF term $h_{dof}$ is parameterized by the shared fit coefficient $c_{dof} \equiv w_z k_0/4$, which depends on the thickness of the cloud $w_z$ in the imaging direction. We include this effect in our fits, but the resulting $w_z \approx 18$ μm is far from $R_z$, implying that oscillatory structure is lost for reasons other than the DoF effect.

Density Correlation Measurements

Figure 9:
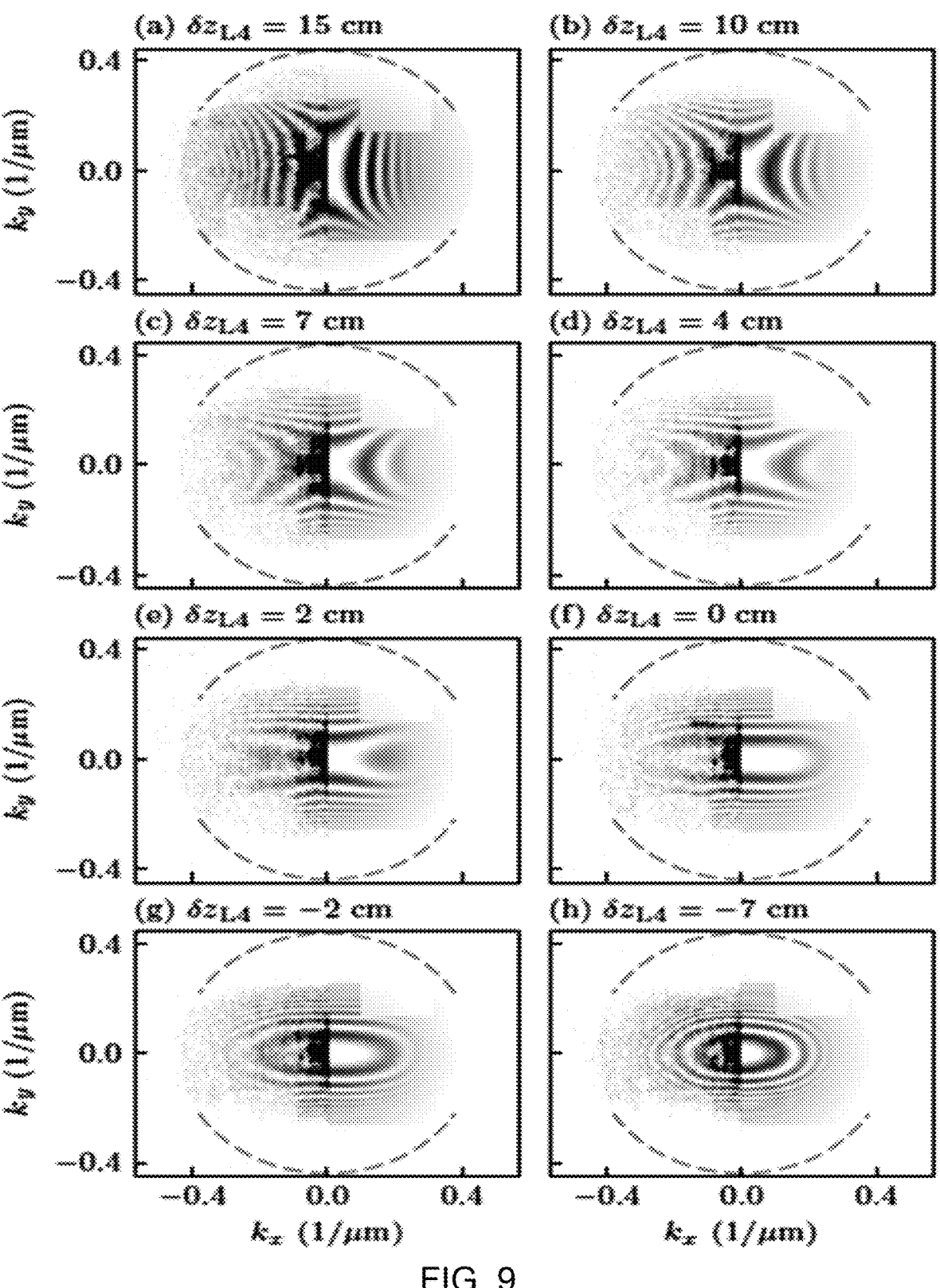
FIG. 9 shows, according to some embodiments, PSDs $\langle|\delta OD_{k_\perp}|^2\rangle$ at differing degrees of defocus including experimental data (left, $k_y<0$) and fits (right, $k_y>0$). These data represent a full set of $\delta z_{L4}$ values, and each measurement was averaged over 100 to 200 images. The dashed arcs on the top and bottom plot the NA limit $|k_\perp|=k_{NA}$ expected for the objective lens. The values for the model parameters in the fits are given in the FIG. 16 and FIG. 10.
Figure 10:
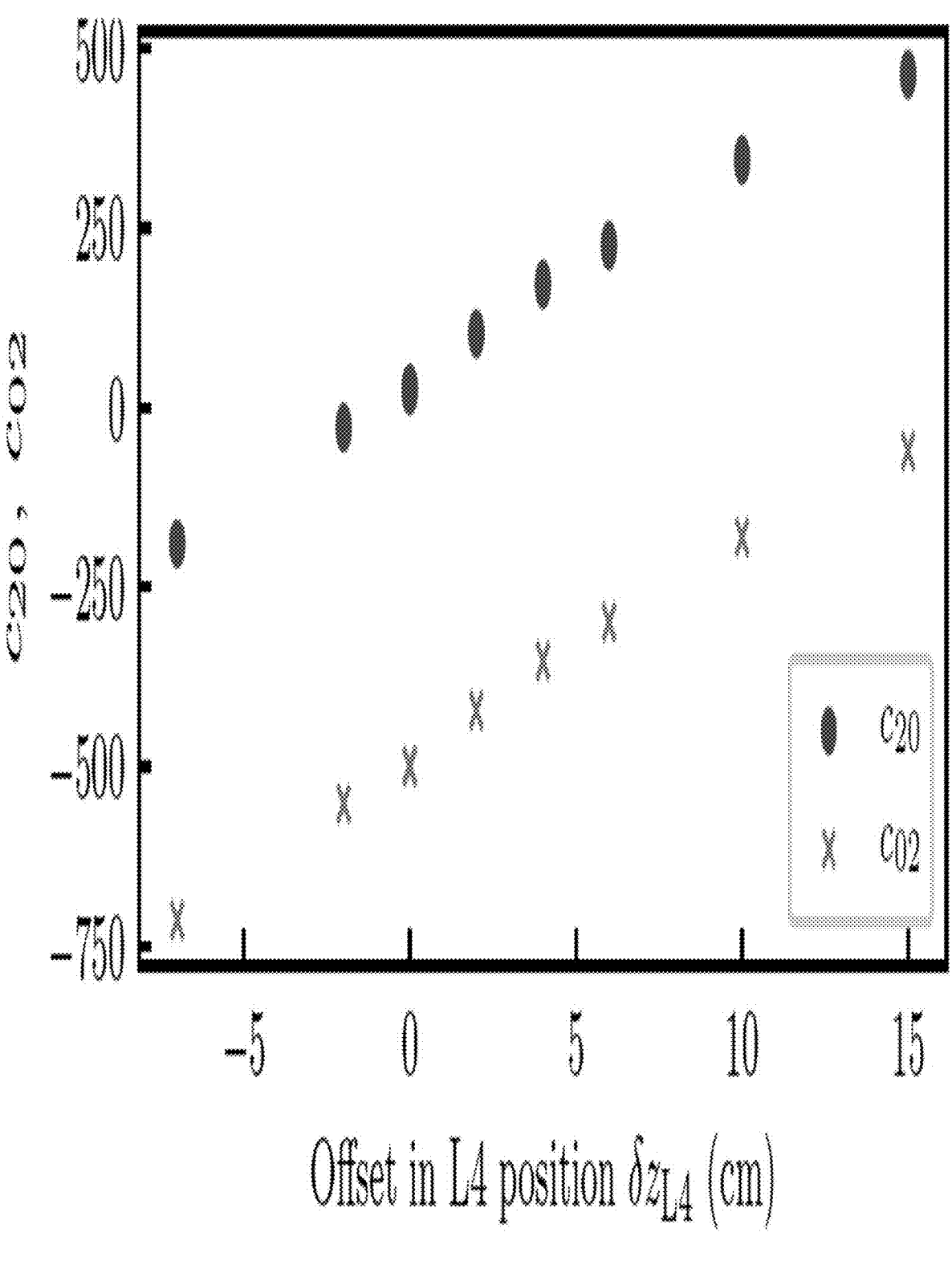
FIG. 10 shows, according to some embodiments, best-fit values for $c_{20}$ and $c_{02}$, extracted from fits to PSD measurements, plotted as a function of $\delta z_{L4}$. At the nominal $e_x$ focal position $\delta z_{L4}=0$ the coefficients are $c_{20}=24.9(5)$ and $c_{02}=-500(1)$.

FIG. 9 shows PSDs measured from in-situ PTAI images of BECs taken at a range of image planes (left half of plots, i.e., $k_y<0$) along with global fit to the aberrations model in Eq. (52) (right half of plots, i.e., $k_y>0$). The best-fit values for the shared parameters are shown in FIG. 16. The defocus parameters $c_{20}$ and $c_{02}$ are shown in FIG. 10 as a function of $\delta z_{LA}$. In total, the global fit to 11 data sets had 40 fit parameters—including overall amplitude and background offset terms for each data set that are not reported.

We determined the aperture term $A(k_\perp)$ for the fit via the following procedure. The overall numerical aperture of the main objective lens limits the maximum accepted wavevector to $k_{NA}$ (dashed cyan arcs in FIG. 9) and thereby $\langle |\delta OD(k_\perp)|^2 \rangle \to 0$ for $|k_\perp|>k_{NA}$. We observe a non-zero background outside the NA circle, as expected from photon shot noise. Our PSD measurements exhibit additional structures, and we focus on the pair at positive $k_y$ giving additional limits to the effective vertical NA (because the PSD derives from the Fourier transform of a real valued quantity, the structures at $k_y<0$ replicate those at $k_y>0$). First, the horizontal cutoff at $k_y \approx 0.26$ μm$^{-1}$ results from an in-vacuum "atom-chip" in our apparatus that intercepts wave-vectors at large $k_y$. A second rectangle carved into the aperture results from screw heads extending down from the atom-chip holder. Extending the dashed cyan curves in FIG. 9 shows that the expected NA limited disk is present for small $|k_y|$ where the atom-chip NA limitations are not present. In our fit $A(k_\perp)$ is modeled as a window function that combines the NA disk of the objective lens with the two additional vertical aperture limits resulting from the atom-chip assembly at positive $k_\perp$. While all the data in FIG. 9(a) have NA limits from the atom-chip assembly, the effects are most visible in (a) which is nearly in focus along $e_y$. We therefore determined the aperture window function from the PSD signal in FIG. 9(a).

Equation (52) describes two key features of the aperture limits that stem from the atom-chip assembly. First, although only up-going scattered light is blocked by then atom-chip assembly, we observe the atom-chip NA limit for both positive and negative $k_y$. In Eq. (52), the first term in curly brackets is a symmetrized aperture that terminates the non-oscillatory contribution to the PSD. This eliminates correlations outside $k_{NA}$ disk in the experimental data. In the second term, the product $A(k_\perp)A(-k_\perp)$ predicts that the oscillatory structure given by $\cos(\ldots)$ terminates at the aperture boundaries. This is observed at the aperture limit from the atom chip assembly as well as the NA limit near $k_y=0$.

The magnification of our microscope changes as a function of $\delta z_{LA}$; at $\delta z_{LA}=0$ cm the resolution is given by the design magnification M=36.3. We empirically identified the magnification at each $\delta z_{LA} \neq 0$ by aligning the observed and expected NA circles. All of our data is presented including these calibrated magnifications.

Similar to the simulated data analysis, photon shot noise was subtracted from the experimental PSD to isolate the atom shot noise. We begin by masking out the signal inside the expected NA circle, where atom shot noise is dominant. We then average the masked data along $k_y$ and subtract it from the signal (eliminating structured noise along $k_x$). Next, we repeat the same subtraction procedure by averaging along $k_x$ (eliminating structured noise along $k_y$).

As demonstrated in FIG. 9, our aberrations model, using coefficients from our global fit, accurately characterizes our microscope and consistently describes the observed aspects in all PSD measurements. The imaging system is astigmatic: FIG. 9(a) and FIG. 9(f) show data nearly focused along $e_y$ and $e_x$ respectively, where the $c_{02}$ and $c_{20}$ coefficients approach zero in FIG. 10. Hence panel (a) has relatively little oscillatory structure along $e_y$, but significant structure along $e_x$; this pattern reverses progressively from (a) to (f) as $\delta z_{LA}$ decreases. The remaining data (g) and (h) show increasing oscillatory structure in both directions as $\delta z_{LA}$ becomes more negative.

Our global fit provides a measure of our phase dot's phase shift $\theta$ using $c_{00}$ obtained for $\delta=0$ along with those measured at $\delta=\pm\frac{1}{2}$. The best-fit values of $c_{00}$ are {1.510(6),1.590(4), 1.812(5)} for detunings {0.5,0,−0.5} respectively. The fit function linearizes Eq. (26) around a non-zero optical depth, avoiding the $1/\delta$ divergence in the small OD expression. Combining these data gives $\theta=−1.6(1)$ rad, which is in good agreement with the design value of $|\pi/2|$ further demonstrating the accuracy of our measurement protocol and aberrations model. We also note the resonance value obtained from $c_{00}$ gives an offset of $\delta=−0.03(6)$ from that obtained by separately measuring the Lorentzian absorption line-shape with the phase dot absent, which had uncertainty ±0.02; therefore, these values agree within their respective uncertainties.

Determining Anti-Symmetric Pupil Phase Contributions

Imaging aberrations determined from PSD measurements yield all components of the pupil function except the anti-symmetric $\beta_-$ described by the odd order $c_{mn}$ parameters. In our data, images reconstructed with $\beta_-=0$ have asymmetric dips above and below the central density peak. We determined $c_{03}$ term by minimizing the difference between reconstructed images and the expected TF distribution. We omitted the first-order terms as they describe real-space translations. Because our BEC's density distribution is highly elongated along $e_x$, its spectral distribution contains only small $k_x$ components. As a result, only coefficients $c_{0m}$ significantly alter the overall density distribution. We then fit reconstructed images to the 2D TF distribution $$\rho(y) = \rho_0\left[1 - \left(\frac{x-x_0}{R_x}\right)^2 - \left(\frac{y-y_0}{R_y}\right)^2\right]^{3/2} \tag{54}$$

with $c_{03}$ (the lowest order remaining contributor to $\beta_-$) included as a fit parameter. The best-fit value for $c_{03}$ is shown in FIG. 16.

Final Pupil Model

Figure 11:
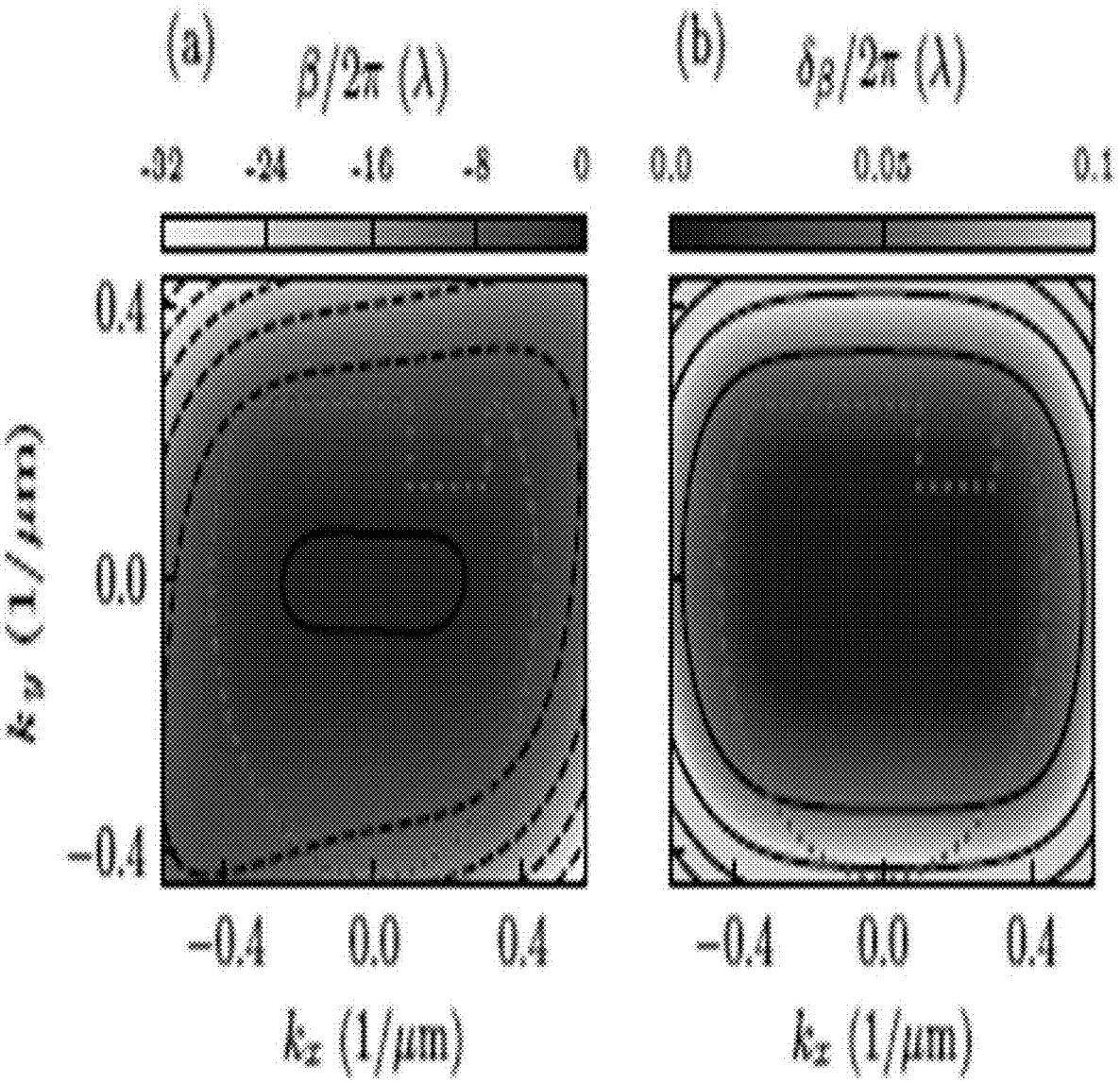
FIG. 11 shows, according to some embodiments, final pupil wavefront model at $\delta z_{L4}=0$ cm. (a) Pupil phase wavefront mean and (b) standard deviation. The red dashed curve outlines the complete aperture limit due to the ultra-high vacuum apparatus geometry. Contour lines (black) are spaced approximately every $8\lambda$ in (a) and $\lambda/20$ in (b).

FIG. 11(*a*) presents our final model for the pupil phase wavefront $\beta$ evaluated at $\delta z_{LA}=0$ cm. FIG. 11(*b*) plots the uncertainty $\delta_\beta(k_\perp)$ computed from our fits' combined covariance matrix (with a total of 41 parameters including shared parameters) assuming a multivariate normal distribution of parameters.

For a complete model of $\beta$, this would imply a rms wavefront error $0.03\lambda$ associated with reconstructed images. In our demonstrated fourth-order model, we were unable to model the $c_{12}$, $c_{21}$ and $c_{30}$ coefficients, which contribute unknown wavefront errors, implying that $0.03\lambda$ is a lower bound for the rms wavefront error of our reconstructions.

Digitally Enhanced Non-Destructive Imaging with Far-Detuned PCI

Figure 12:
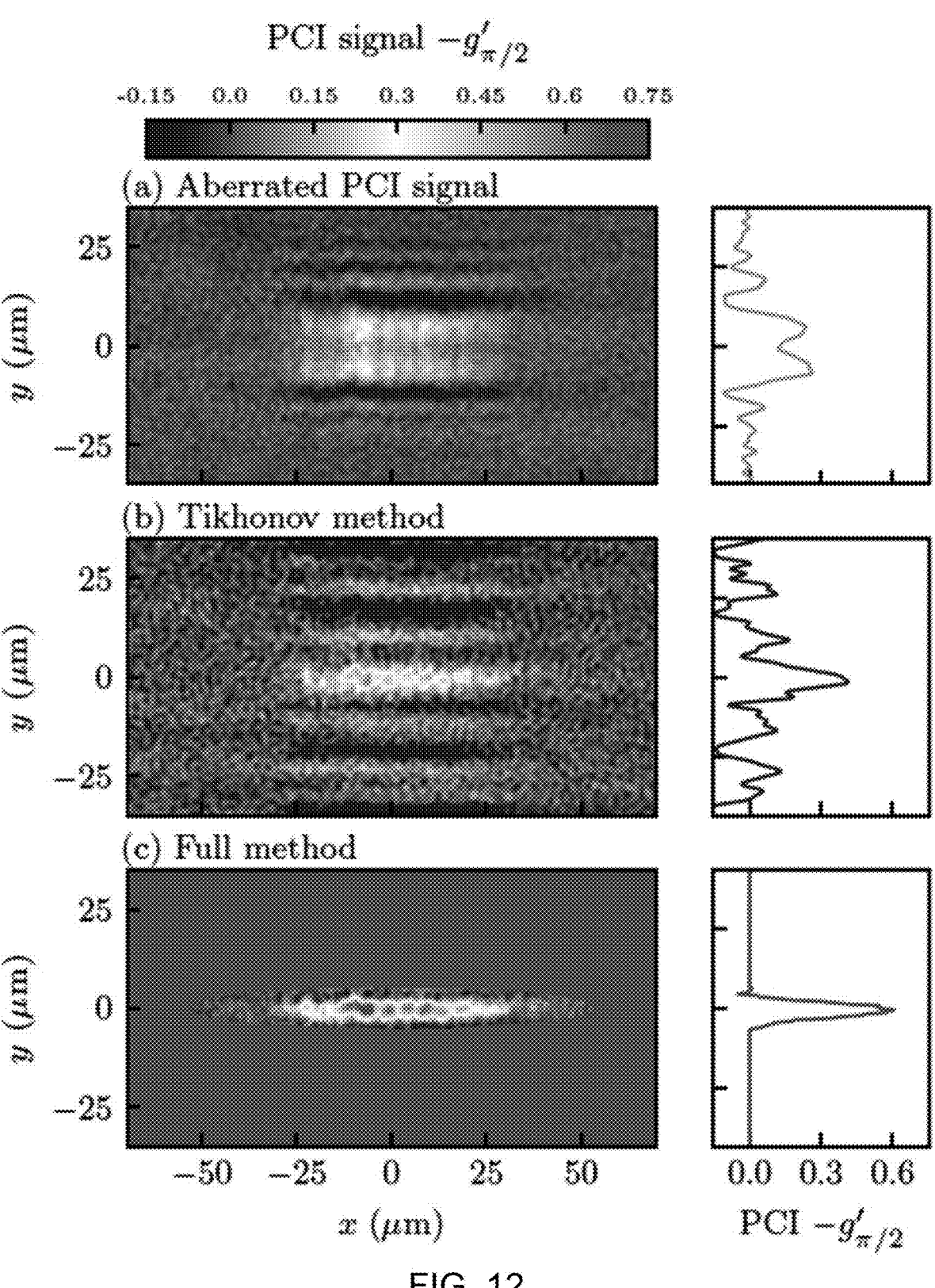
FIG. 12 shows, according to some embodiments, far detuned in-situ PCI images of BECs showing raw and reconstructed signals. (a) Raw PCI signal at probe detuning $\delta\approx106$. (b) Reconstructed PCI signal with the Tikhonov approach with $\alpha=0.1$. (c) Reconstructed PCI signal using the full method. For each case a vertical cross section is shown on the right.

With the aberrations of our ultracold atom microscope quantified, we proceed to aberration compensation of images of BECs taken in-situ with far-detuned PCI. FIG. 12(*a*) presents the raw aberrated image, while (b) and (c) compare reconstructions using the Tikhonov (with $\alpha=0.1$) and full methods. The observed background noise in the aberrated image (a) is consistent with that predicted by our numerical model [FIG. 5(*b*)]. The full method used a 2D elliptical Tukey window function with semi-major and semi-minor axes ($1.25\times R_x$, $1.5\times R_y$), and with Tukey parameter 0.25; $R_x$ and $R_y$ are the TF radii determined in-situ. The Tikhonov reconstruction contains multiple artifacts and added noise, and as discussed in Sec. 3.3, $\alpha$ in Eq. (49)] presents a trade-off: noise is reduced, but the accuracy of the reconstruction is sacrificed. On the other hand, the full method reduces both noise and spectral artifacts while recovering the TF distribution with increased accuracy.

Our reconstruction does not include the experimentally determined aperture $A(k_\perp)$ in the contrast transfer function $h(k_\perp)$. Both with experimental and simulated data, including the rectangular structure from the atom chip assembly led to significant artifacts in the ad hoc reconstruction and somewhat degraded the performance of the full method.

In-Situ Observation of BEC Phase Transition

Figure 13:
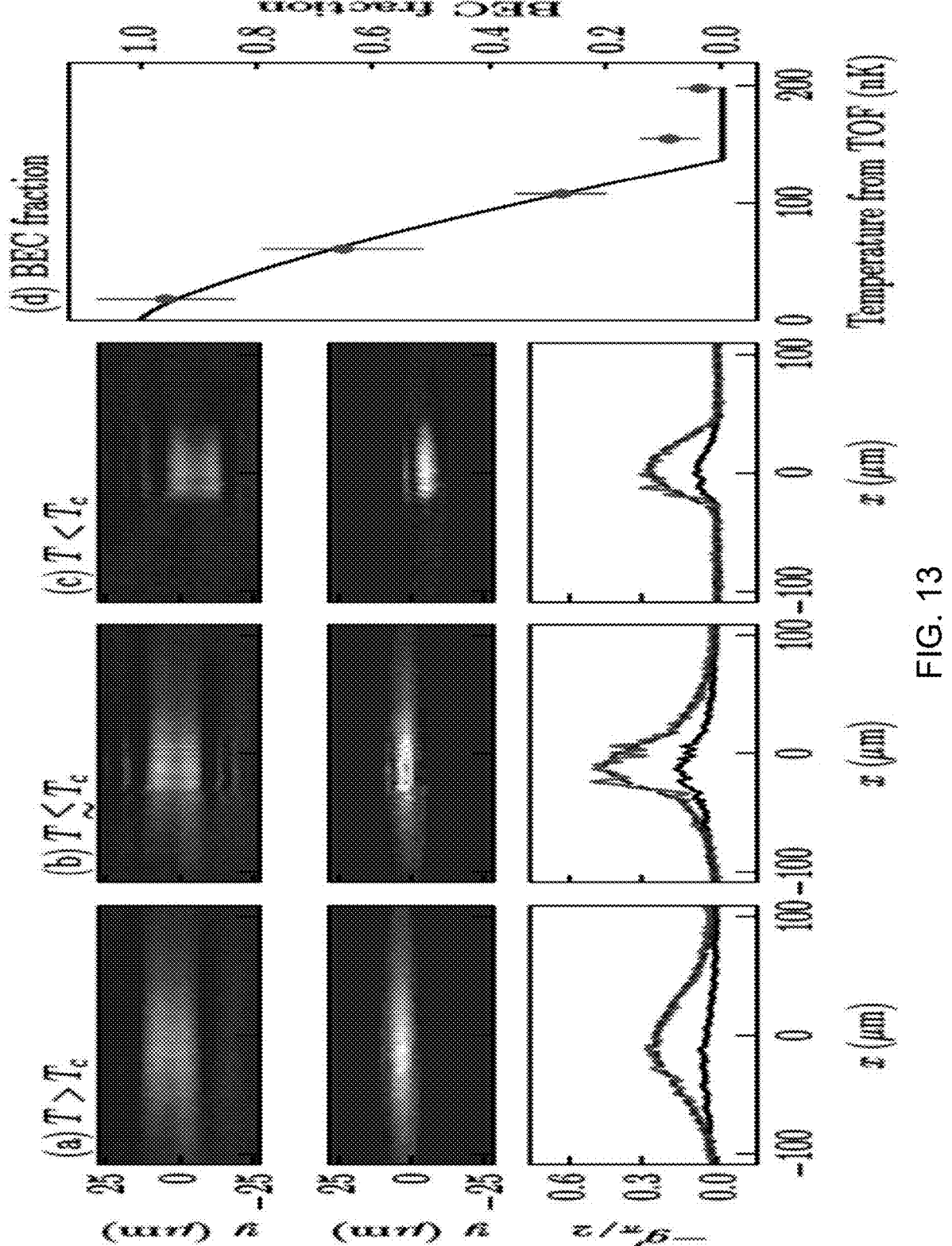
FIG. 13 shows, according to some embodiments, direct in situ observation of BEC phase transition. Top and middle: raw and refocused images with the same color scheme as in FIG. 12. Bottom: horizontal cross sections for the raw (black) and reconstructed (red) data, and the fits (purple dashed) to 1D Gaussian, images. (a) Thermal cloud at $T>T_c$. (b) Partially condensed system at $T\lesssim T_c$, with both thermal and condensate components visible. (c) Pure bimodal, and TF distributions, respectively, for each regime. Each raw image was acquired at probe detuning $\delta\approx106$ and averaged over 20 TOF data, and the solid curve is a fit to a function. condensate at $T\ll T_c$ (d) Condensate fraction measured from in-situ images plotted as a function of temperature obtained separately from TOF data, and the solid curve is fit to a function.

Here we demonstrate an application of increased accuracy of the full regularization method by directly and non-destructively observing condensate formation in a crossed ODT using far-detuned PCI. FIG. 13 reveals the BEC phase transition in the refocused images (middle row) as we decrease the ODT depth, cooling to lower temperatures from above the critical temperature $T>T_c$ in (a), to just below $T\lesssim T_c$ in (b) and to well below $T<<T_c$ in (c). We independently imaged the cold cloud in time-of-flight using AI to calibrate the temperature.

In raw aberrated images (FIG. 13 top row) only very qualitative features of the density distribution are visible, stymieing quantitative analysis. The bottom row of FIG. 13 compares the horizontal cross sections of raw images (black curves) and refocused images (red curves) and the fits (purple dashed curves) to the expected density profile for each case. We observe that the refocused data are generally in good agreement with the expected thermal plus TF distribution. However, in both cases with $T<T_c$, we observe oscillatory structure in the density around $x\approx-20$ μm, potentially indicating a previously undetected fringe on our ODT laser beam. This structure does not correlate with any features of the probe beam. Additional structure for $x>0$ appears at higher temperature (both here and in FIG. 12), which we interpret as arising from excitations in moderate temperature quasi-1D BECs. Lastly, FIG. 13(*d*) shows the condensate fraction obtained from our in-situ non-destructively measured yet aberrated images, illustrating the effectiveness of our reconstruction method to yield images suitable for quantitative analysis. We fit the measured condensate fraction to $\max((1-T/T_c)^a, 0)$, where a and $T_c$ are fit parameters; this expression is valid both for harmonically trapped and free non-interacting bosons. For harmonic confinement in $D\geq2$ dimensions a=D, and for free particles in 3D a=3/2. Our fit yields $T_c=136(20)$ nK, and a=1.4(6) is consistent with the free space prediction, however, given the known impact of interactions this is coincidental.

Conclusion and Outlook

In this paper we presented a versatile high-resolution ultracold atom microscope composed of two main components: 1) an economical and practical imaging system based on high NA off-the-shelf optics; and 2) a novel, high-fidelity digital aberration removal technique that is compatible with a wide range of imaging techniques. The combination of these two elements yields an ultracold atom microscope that can be easily integrated to existing cold-atom apparatus, this is in contrast with quantum gas microscopes, which necessitate costly and typically custom designed optics. Imaging artifacts resulting from the geometrical constraints of an existing vacuum system or imperfections in the optical elements are mitigated using our digital aberration removal technique. An important point is that for NA$\gtrsim0.25$ compensation is required to account for the vacuum windows; for example, using an uncompensated NA=0.6 objective in tandem with a vacuum cell requires correction of some sort, either optical or digital. As such our high-resolution ultracold atom microscope is adaptable, simple and effective. Furthermore, our reconstruction algorithms are not limited to cold-atom experiments and can be applied in any case where the real and imaginary parts of the susceptibility are proportional to the quantity of interest.

Our full method completely solves the minimization problem at the price of a numerically costly iterative algorithm. We also showed that a simple ad hoc approximation leads to a method with only slightly degraded performance, suitable for real-time use in a lab setting.

All of our current implementations approximate the true relationship between the detected signal and the ideal recovered signal with a linear transformation that is valid only for small signals. This leads to the visible underestimation of the true density in the simulated reconstructions which have peak signal g≈1. Although it is doubtful that algebraic progress beyond Eq. (44) can be made for the true non-linear transformation, we expect that non-linear numerical methods would be able to find the recovered signal without the small g approximation. This would extend this method to be applicable to the full range of available data.

Series Expansion

The numerator of Eq. (48) can be evaluated using Fourier methods, but because an inverse is required, the denominator is difficult to evaluate. Nearly diagonal matrices have a compact series expansion that in the present case allows for (somewhat) efficient evaluation. One expression for the inverse is $$\left(1+J^\dagger J\right)^{-1} \approx D^{-1} - D^{-1}ND^{-1}$$
$$+D^{-1}ND^{-1}ND^{-1} -$$

US 12,670,563 B2

39 where D denotes any matrix of diagonal elements, where $1+J^\dagger J=D+N$. This whole expansion may be computed in a straightforward manner, and while this method converges, it does so slowly. The art in this method is in the selection of D to give the most rapid convergence. We found superior performance using the conjugate gradient method described in the main text.

Grid Size and Padding

Our method acquires additional considerations when the field of view is limited, i.e., when a significant fraction of the aberrated diffraction pattern is outside the observed field of view. Here we consider this case by analyzing Eq. (35).

In the general vicinity of some $k_0$ the phase shift may be Taylor expanded as $\beta(k_0+\delta k)\approx\beta(k_0)+\delta k\cdot\nabla_k\beta(k)$; thus both terms in h(k) are approximated by displacement operators, with $\delta x=\pm\nabla_k\beta(k)$, for Fourier components centered at $k_0$. Our data consists of images with extent L; assuming the object is centered on the image, this implies that for $\delta x>L/2$ the information near $k_0$ will not have been detected.

Our algorithm uses standard Fourier methods with periodic boundary conditions, in which case these components will wrap-around: a non-physical behavior. To avoid this, we require $|\partial_{k_x,k_y}\beta(k)|<L/2$; when we discretize onto a momentum lattice with spacing $2\pi/L$ this implies $$|\beta(k_0+2\pi/L)-\beta(k_0)|<\pi. \qquad (B1)$$

This is to say any phase change in a single momentum-space pixel that is larger than $\pi$ will give signal outside the field of view and should not be included. In other language, this is the Nyquist limit associated with this signal.

In our implementation we resolve this two ways: (1) We cap the gradient of the phase shift $\nabla_k\beta(k)$ as it approaches the Nyquist threshold. (2) If this is insufficient (for example, if the Nyquist limit is violated inside the imaging aperture), we pad the measurement m such that Eq. (B1) is satisfied, and set the inverse uncertainties $\overline{\sigma}^{-1}$ to zero at these points, thereby assigning them zero weight in the objective function.

The following are incorporated by reference in their entirety:

H. Zhang, J. Wang, D. Zeng, X. Tao, and J. Ma, *Regularization Strategies in Statistical Image Reconstruction of Low-Dose X-Ray Ct: A Review*, Medical Physics 45, 45 (2018).

R. Molina, J. Nunez, F. Cortijo, and J. Mateos, *Image Restoration in Astronomy: A Bayesian Perspective*, IEEE Signal Processing Magazine 18, 11 (2001).

J. L. Starck, E. Pantin, and F. Murtagh, *Deconvolution in Astronomy: A Review*, Publications of the Astronomical Society of the Pacific 114, 1051 (2002).

M. R. Andrews, M.-O. Mewes, N. J. van Druten, D. S. Durfee, D. M. Kurn, and W. Ketterle, Direct, *Nondestructive Observation of a Bose Condensate*, Science 273, 84 (1996).

Y. Zhang and H. Gross, *Systematic Design of Microscope Objectives. Part I: System Review and Analysis*, Advanced Optical Technologies 8, 313 (2019).

W. S. Bakr, J. I. Gillen, A. Peng, S. Fölling, and M. Greiner, *A Quantum Gas Microscope for Detecting Single Atoms in a Hubbard-Regime Optical Lattice*, Nature 462, 74 EP (2009).

J. F. Sherson, C. Weitenberg, M. Endres, M. Cheneau, I. Bloch, and S. Kuhr, *Single-atom-resolved fluorescence imaging of an atomic Mott insulator*, Nature 467, 68 (2010).

40

J. A. Hogbom, *Aperture Synthesis with a Non-Regular Distribution of Interferometer Baselines*, Astronomy and Astrophysics Supplement 15, 417 (1974).

J. Idier, editor, *Bayesian Approach to Inverse Problems* (Wiley, 2008).

G. Demoment, *Image Reconstruction and Restoration: Overview of Common Estimation Structures and Problems*, IEEE Transactions on Acoustics, Speech, and Signal Processing 37, 2024 (1989).

L. Turner, K. Domen, and R. Scholten, *Diffraction-Contrast Imaging of Cold Atoms*, Physical Review A 72, 031403-1 (2005).

P. B. Wigley, P. J. Everitt, K. S. Hardman, M. R. Hush, C. H. Wei, M. A. Sooriyabandara, P. Manju, J. D. Close, N. P. Robins, and C. C. N. Kuhn, *Non-Destructive Shadowgraph Imaging of Ultra-Cold Atoms*, Opt. Lett. 41, 4795 (2016).

A. R. Perry, S. Sugawa, F. Salces-Carcoba, Y. Yue, and I. B. Spielman, *Multiple-Camera Defocus Imaging of Ultracold Atomic Gases*, Opt. Express 29, 17029 (2021).

J. R. Fienup, *Phase Retrieval Algorithms: A Comparison*, Appl. Opt. 21, 2758 (1982).

J. R. Fienup, J. C. Marron, T. J. Schulz, and J. H. Seldin, *Hubble Space Telescope Characterized by Using Phase-Retrieval Algorithms*, Appl. Opt. 32, 1747 (1993).

A. N. Tikhonov and V. Y. Arsenin, *Solution of Ill-Posed Problems* (Washington: Winston & Sons, 1977).

N. Wiener, *The Interpolation, Extrapolation and Smoothing of Stationary Time Series* (The MIT Press, 1949).

F. Orieux, J.-F. Giovannelli, and T. Rodet, *Bayesian Estimation of Regularization and Point Spread Function Parameters for Wiener-Hunt Deconvolution*, J. Opt. Soc. Am. A 27, 1593 (2010).

A. Korpel, K. E. Lonngren, P. P. Banerjee, H. K. Sim, and M. R. Chatterjee, *Split-Step-Type Angular Plane-Wave Spectrum Method for the Study of Self-Refractive Effects in Nonlinear Wave Propagation*, J. Opt. Soc. Am. B 3, 885 (1986).

A. Putra, D. L. Campbell, R. M. Price, S. De, and I. B. Spielman, *Optimally focused cold atom systems obtained using density-density correlations*, Review of Scientific Instruments 85, 13110 (2014).

F. Zernike, Phase Contrast, *a New Method for the Microscopic Observation of Transparent Objects*, Physica 9, 686 (1942).

F. Zernike, Phase Contrast, *a New Method for the Microscopic Observation of Transparent Objects Part Ii*, Physica 9, 974 (1942).

A. G. Oettlé, *Golgi Apparatus of Living Human Testicular Cells Seen with Phase-Contrast Microscopy*, Nature 162, 76 (1948).

R. G. Fassett, B. A. Horgan, and T. H. Mathew, *Detection of Glomerular Bleeding by Phase-Contrast Microscopy.*, Lancet 1, 1432 (n.d.).

W. Ketterle, D. S. Durfee, and D. Stamper-Kurn, *Bose-Einstein Condensation in Atomic Gases, Proceedings of the International School of Physics "Enrico Fermi"*, Course CXL, in edited by M. Inguscio, S. Stringari, and C. E. Wieman (IOS Press, 1999), pp. 67-176.

R. Andrews, D. M. Kurn, H.-J. Miesner, D. S. Durfee, C. G. Townsend, S. Inouye, and W. Ketterle, *Propagation of Sound in a Bose-Einstein Condensate*, Phys. Rev. Lett. 79, 553 (1997).

B. P. Anderson, P. C. Haljan, C. A. Regal, D. L. Feder, L. A. Collins, C. W. Clark, and E. A. Cornell, *Watching Dark Solitons Decay into Vortex Rings in a Bose-Einstein Condensate*, Phys. Rev. Lett. 86, 2926 (2001).

G. Reinaudi, T. Lahaye, Z. Wang, and D. Guéry-Odelin, *Strong Saturation Absorption Imaging of Dense Clouds of Ultracold Atoms*, Opt. Lett. 32, 3143 (2007).

M. Gajdacz, P. L. Pedersen, T. Mørch, A. J. Hilliard, J. Arlt, and J. F. Sherson, *Non-destructive Faraday imaging of dynamically controlled ultracold atoms*, Review of Scientific Instruments 84, 83105 (2013).

D. V. Freilich, D. M. Bianchi, A. M. Kaufman, T. K. Langin, and D. S. Hall, *Real-Time Dynamics of Single Vortex Lines and Vortex Dipoles in a Bose-Einstein Condensate*, Science 329, 1182 (2010).

A. Ramanathan, S. R. Muniz, K. C. Wright, R. P. Anderson, W. D. Phillips, K. Helmerson, and G. K. Campbell, *Partial-Transfer Absorption Imaging: A Versatile Technique for Optimal Imaging of Ultracold Gases*, Review of Scientific Instruments 83, 083119 (2012).

E. M. Seroka, A. V. Curiel, D. Trypogeorgos, N. Lundblad, and I. B. Spielman, *Repeated Measurements with Minimally Destructive Partial-Transfer Absorption Imaging*, Opt. Express 27, 36611 (2019).

R. Schley, A. Berkovitz, S. Rinott, I. Shammass, A. Blumkin, and J. Steinhauer, *Planck Distribution of Phonons in a Bose-Einstein Condensate*, Phys. Rev. Lett. 111, 055301 (2013).

C.-L. Hung, X. Zhang, L.-C. Ha, S.-K. Tung, N. Gemelke, and C. Chin, *Extracting Densitydensity Correlations Fromin Situimages of Atomic Quantum Gases*, New Journal of Physics 13, 075019 (2011).

P. Penczek, J. Zhu, R. Schröder, and J. Frank, *Three Dimensional Reconstruction with Contrast Transfer Compensation from Defocus Series*, Scanning Microscopy 11, 47 (1997).

W. H. Press, S. A. Teukolsky, W. T. Vetterling, and B. P. Flannery, *Numerical Recipes: The Art of Scientific Computing* (Cambridge University Press, 2007).

X. Li, M. Ke, B. Yan, and Y. Wang, *Reduction of Interference Fringes in Absorption Imaging of Cold Atom Cloud Using Eigenface Method*, Chin. Opt. Lett. 5, 128 (2007).

S. R. Segal, Q. Diot, E. A. Cornell, A. A. Zozulya, and D. Z. Anderson, *Revealing Buried Information: Statistical Processing Techniques for Ultracold-Gas Image Analysis*, Phys. Rev. A 81, 053601 (2010).

F. Dalfovo, S. Giorgini, L. P. Pitaevskii, and S. Stringari, *Theory of Bose-Einstein Condensation in Trapped Gases*, Rev. Mod. Phys. 71, 463 (1999).

Y. Castin and R. Dum, *Bose-Einstein Condensates in Time Dependent Traps*, Phys. Rev. Lett. 77, 5315 (1996).

S. Dettmer et al., *Observation of Phase Fluctuations in Elongated Bose-Einstein Condensates*, Phys. Rev. Lett. 87, 160406 (2001).

N. Tammuz, R. Smith, R. Campbell, S. Beattie, S. Moulder, J. Dalibard, and Z. Hadzibabic, *Can a Bose Gas Be Saturated?*, Phys. Rev. Lett. 106, (2011).

P. Sprent, *Inversion of Nearly Diagonal Matrices*, The Mathematical Gazette 49, 184 (1965).

L. D. Turner et al., PRA 72 031403 (2005).

A. R. Perry et al., Opt. Express 29 17029-17041 (2021).

P. A. Penczek et al., Scanning Microscopy 11 47-154 (1997).

J. R. Fienup et al., Appl. Opt. 32 1747-1767 (1993).

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two.

A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive, rather the elements can be used separately or can be combined together under appropriate circumstances.

What is claimed is:

1. A computer implemented process for removing aberrations in an acquired image from imperfect imaging optics, the process comprising: acquiring an acquired image of an object with an imperfect imaging system that comprises an imperfect imaging optic, the acquire comprising a plurality of pixels; producing a prior that comprises an expectation of data for the object; determining a pixel-by-pixel uncertainty of the acquired image; determining a total transfer function $h_k$ of the acquired image from the prior and the acquire image; and determining a data vector d from the total transfer function $h_k$ and the acquired image to remove aberrations from the acquired image; wherein the total transfer function hk is provided by $$h_{tot}(k_\perp) = \sqrt{\frac{1}{4} + \hat{\sigma}^2}\, h_{DOF}(k_\perp)\frac{h_E(k_\perp)}{h_E(0)}e^{i(\varphi-\theta)}.$$

2. The process of claim 1, further comprising converting the acquired image to vector $m_j$.

3. The process of claim 1, wherein the prior is set to zero if there is no expectation of data.

4. The process of claim 1, wherein the prior is provided by a Gaussian distribution function.

5. The process of claim 1, wherein the expectation comprises information about the object or information about the imperfect imaging system.

6. The process of claim 1, wherein determining the pixel-by-pixel uncertainty of the acquired image comprises accounting for photon shot noise of a digital imaging device of the imperfect imaging system that acquired the acquired image.

7. The process of claim 6, wherein accounting for the photon shot noise comprises obtaining the square root of the pixel values of the acquired image.

8. The process of claim 6, further comprising performing background subtraction on the acquired image prior to determining the pixel-by-pixel uncertainty of the acquired image.

9. The process of claim 6, wherein determining the pixel-by-pixel uncertainty of the acquired image comprises accounting for readout noise of the imperfect imaging system that acquired the acquired image.

10. The process of claim 8, further comprising, after performing background subtraction, replacing any negative values of the pixel values with a positive value.

11. The process of claim 10, wherein the positive value is the smallest positive number of all of the pixels.

12. The process of claim 10, wherein the positive value is obtained by averaging pixel values of neighboring pixels.

13. The process of claim 1, wherein determining the total transfer function $h_k$ comprises determining aberrations in the acquired image, the aberrations comprising attenuation y and phase shift B.

14. The process of claim 1, wherein the data vector d is an optimal reconstructed image.

15. The process of claim 1, wherein determining the data vector d comprises numerically solving linear equations with a conjugate gradient method.

16. The process of claim 1, further comprising estimating a Fourier pupil function of the imperfect imaging system.

17. The process of claim 16, wherein estimating the Fourier pupil function comprises determining a density correlation.

18. The process of claim 16, wherein estimating the Fourier pupil function comprises determining aberrations in the acquired image from a diffraction pattern in the acquired image.

19. The process of claim 16, wherein estimating the Fourier pupil function comprises determining a point spread function and obtaining even order aberrations from the point spread function.

20. The process of claim 16, further comprising producing a polynomial a plurality of loss coefficients as a result of estimating the Fourier pupil function of the imperfect imaging system.

21. The process of claim 20, further comprising quantifying the spatial structure of the object as the pixel-by-pixel uncertainty of the acquired image.

22. A computer implemented process for removing aberrations in an acquired image from imperfect imaging optics, the process comprising: acquiring an acquired image of an object with an imperfect imaging system that comprises an imperfect imaging optic, the acquired image comprising a plurality of pixels; producing a prior that comprises an expectation of data for the object; determining a pixel-by-pixel uncertainty of the acquired image; determining a total transfer function $h_k$ of the acquired image from the prior and the acquired image; and determining a data vector d from the total transfer function $h_k$ and the acquired image to remove aberrations from the acquired image; wherein, in determining the total transfer function $h_k$, the attenuation $\gamma$ and the

46 phase shift $\beta$ are accounted for by the following forward transfer function $h_E$ $$h_E(k_\perp) = e^{-\gamma(k_\perp)+i\beta(k_\perp)}.$$

23. A computer implemented process for removing aberrations in an acquired image from imperfect imaging optics, the process comprising: acquiring an acquired image of an object with an imperfect imaging system that comprises an imperfect imaging optic, the acquired image comprising a plurality of pixels; producing a prior that comprises an expectation of data for the object; determining a pixel-by-pixel uncertainty of the acquired image; determining a total transfer function $h_k$ of the acquired image from the prior and the acquired image; and determining a data vector d from the total transfer function $h_k$ and the acquired image to remove aberrations from the acquired image; further comprising verifying a statistical likelihood of the data vector d based on the acquired image and the pixel-by-pixel uncertainty of the acquired image, wherein verifying the statistical likelihood of the data vector d comprises evaluating $$(Hd - m)^\dagger E^{-1}(Hd - m).$$

* * * * *